United States Patent
Gade et al.

(10) Patent No.: US 10,669,919 B2
(45) Date of Patent: Jun. 2, 2020

(54) SELF-RESTRAINING ABRASION PREVENTION EXHAUST CONDUIT

(71) Applicant: American BOA, Inc., Cumming, GA (US)

(72) Inventors: Srinivas Gade, Cumming, GA (US); Erick Michael Dickman, Cumming, GA (US)

(73) Assignee: American BOA, Inc., Cumming, GA (US)

( * ) Notice: Subject to any disclaimer, the term of this patent is extended or adjusted under 35 U.S.C. 154(b) by 13 days.

(21) Appl. No.: 16/021,603

(22) Filed: Jun. 28, 2018

(65) Prior Publication Data

US 2019/0010856 A1    Jan. 10, 2019

Related U.S. Application Data

(60) Provisional application No. 62/529,066, filed on Jul. 6, 2017.

(51) Int. Cl.
*F16L 51/02* (2006.01)
*F01N 13/18* (2010.01)
(Continued)

(52) U.S. Cl.
CPC ...... *F01N 13/1816* (2013.01); *F16L 27/1004* (2013.01); *F16L 27/11* (2013.01);
(Continued)

(58) Field of Classification Search
CPC ......... F16L 51/02; F16L 51/026; F16L 55/04; F16L 27/111; F01N 13/08
(Continued)

(56) References Cited

U.S. PATENT DOCUMENTS 3,550,639 A * 12/1970 Okuda ............... F16L 27/12
                                                138/121
5,340,165 A *  8/1994 Sheppard ........... F16L 27/111
                                                285/226
(Continued)

FOREIGN PATENT DOCUMENTS

CN    106369231 A     2/2017
DE    102011110147 A1 2/2013
(Continued)

OTHER PUBLICATIONS

International Searching Authority, International Search Report and Written Opinion issued in corresponding Appln. No. PCT/IB2015/000710 dated Oct. 2, 2018, 13 pages.

*Primary Examiner* — Patrick F Brinson
(74) *Attorney, Agent, or Firm* — Wood Herron & Evans LLP

(57) ABSTRACT

A multiple component hot gas flowing conduit has an elongated, convoluted bellows, an interlock liner, frequency dampers and elastic spacers engaging the dampers and biasing the dampers into respective bellows convolution with no contact of bellows and liner for all operating states of the conduit. Assembly pretension of the interlock liner preferably flattens out the elastic spacers permitting assembly of the liner into the bellows and upon relaxation of the liner, the spacers extend radially outwardly to engage and bias the dampers into the bellows. The bellows is convoluted throughout, or may have convoluted ends with an integral smooth-wall tube therebetween. Components are isolated from abrasion against one another.

17 Claims, 24 Drawing Sheets

(51) Int. Cl.
*F16L 27/11* (2006.01)
*F16L 27/10* (2006.01)
*F16L 55/033* (2006.01)
*F16L 27/111* (2006.01)

(52) U.S. Cl.
CPC ........... *F16L 27/111* (2013.01); *F16L 51/025* (2013.01); *F16L 51/026* (2013.01); *F16L 55/033* (2013.01); *F01N 2470/12* (2013.01)

(58) Field of Classification Search
USPC ................................ 138/121, 122, 114, 148
See application file for complete search history.

(56) References Cited

U.S. PATENT DOCUMENTS

| | | | |
|---|---|---|---|
| 5,992,896 A * | 11/1999 | Davey | F01N 13/1811 |
| | | | 285/226 |
| 6,230,748 B1 | 5/2001 | Krawietz et al. | |
| 6,848,478 B2 * | 2/2005 | Nagai | F01N 13/1816 |
| | | | 138/112 |
| 8,453,680 B2 | 6/2013 | Weiss et al. | |
| 8,463,680 B2 * | 6/2013 | Knapp | G06Q 20/042 |
| | | | 705/35 |
| 2016/0003388 A1 | 1/2016 | Barbely et al. | |

FOREIGN PATENT DOCUMENTS

| | | |
|---|---|---|
| EP | 0282689 A2 | 9/1988 |
| WO | 2016005096 A1 | 1/2016 |
| WO | 2016012660 A1 | 1/2016 |

* cited by examiner

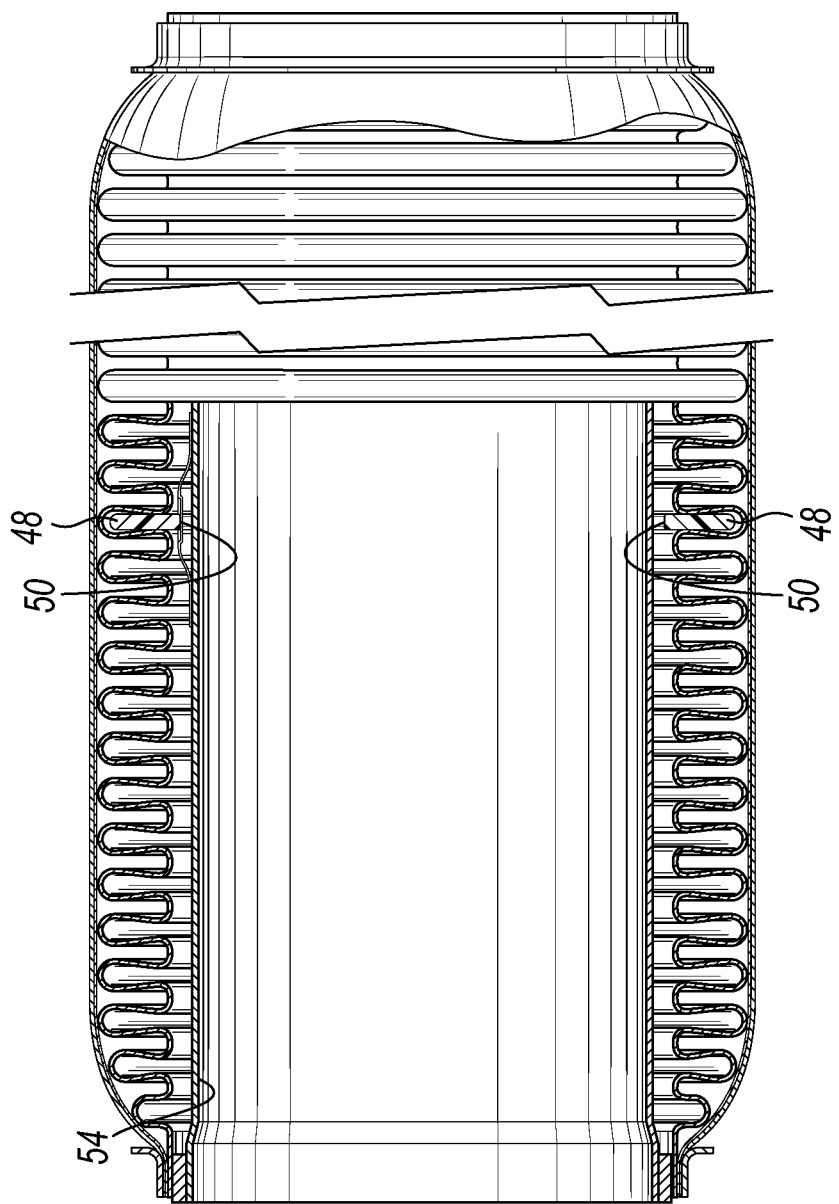

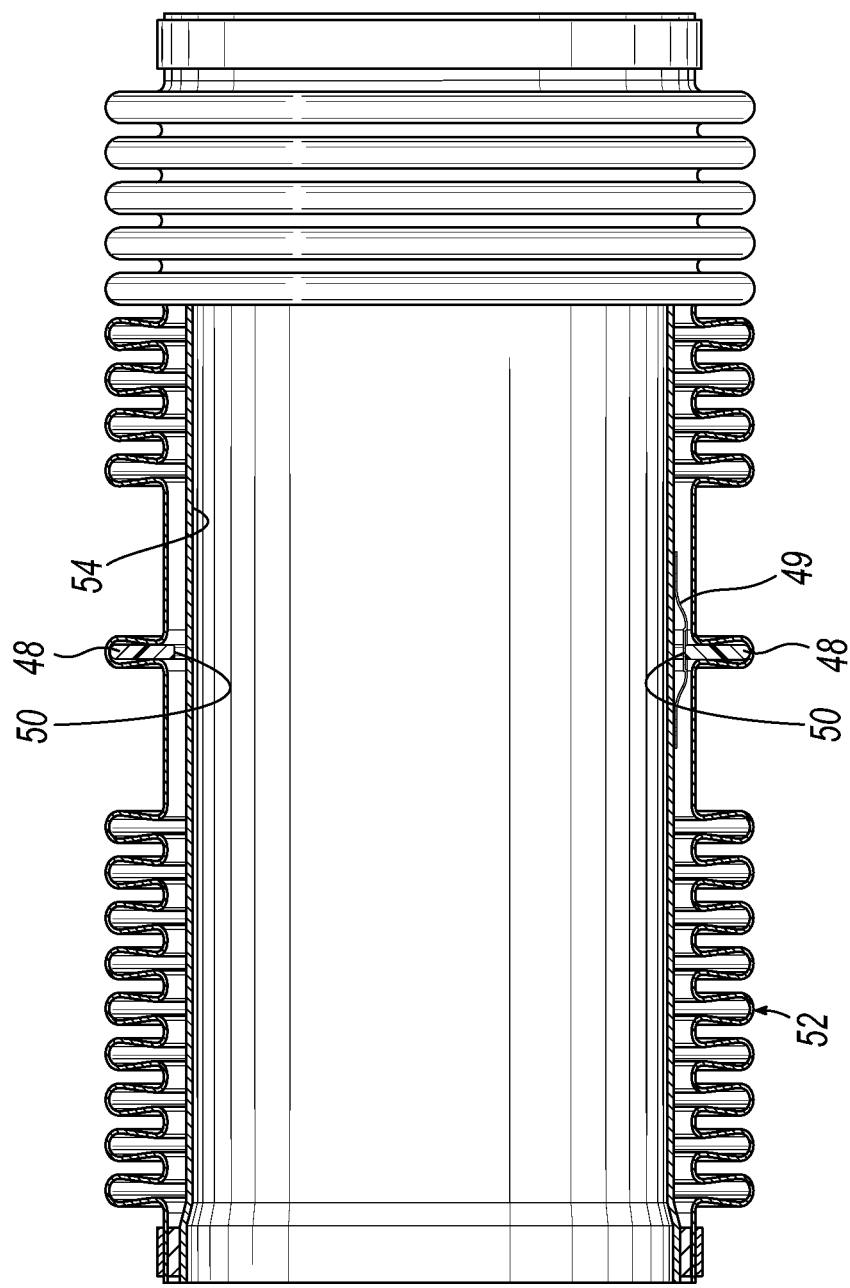

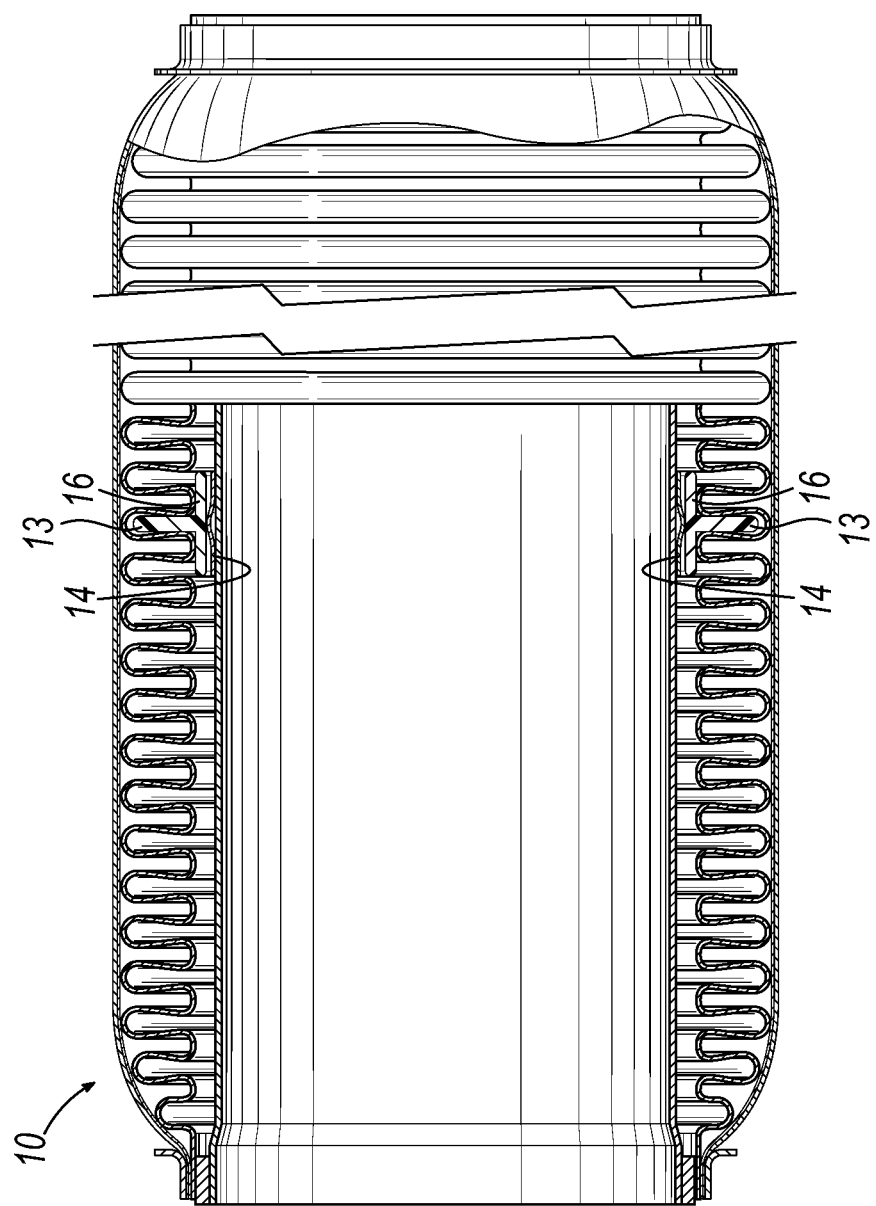

SELF-RESTRAINING ABRASION PREVENTION EXHAUST CONDUIT

PRIORITY CLAIM

Applicant claims benefit of the filing date of Jul. 6, 2017 which is the filing date of U.S. Provisional Patent Application Ser. No. 62/529,066 which application is incorporated herein in its entirety as if fully set forth herein.

FIELD OF THE INVENTION

This invention relates to multiple component conduits for hot exhaust gases and more particularly to conduits, hoses, decoupling elements and the like including corrugated exterior bellows, internal metallic liner hose and intermediate damping elements disposed therebetween.

BACKGROUND OF THE INVENTION

Hot exhaust gas flowing hoses having an external corrugated bellows sleeve, internal hoses of metallic interlock or other forms of liners, and/or damper elements therebetween are known. Such devices, for example, are disclosed in U.S. Pat. Nos. 8,453,680; 6,230,748 and U.S. Pat. No. 9,970,578, all of which are expressly incorporated herein by reference as if fully expressly set forth herein.

There are several concerns inherent in such prior, multiple component, hot gas hoses. For example, engagement between the intermediate damping elements and the interlock liner or engagement between the intermediate damping elements and the external corrugated bellows results in abrasion of the interlock liner or of the damping element or of the external corrugated bellows, leading to failure of components. Nevertheless, prior damping elements are primarily disposed between liner and bellows for damping natural frequencies of the bellows and not, if at all, for any component interaction or abrasion preventing function.

In the construction of a hose with bellows, damper and liner components, while pretension of components in assembly is useful, it is not universally required. Without assembly pretension, later interaction between components accelerates when there is high g-loading, causing severe abrasion between the damping element and the interlock liner or the damping element and the external corrugated bellows.

Moreover, assembly pretension or interference fit of components is not feasible without use of some sort of a guiding element to permit assembly of bellows and interlock liner with intermediate dampers.

And some prior, multiple component, hot gas hoses are only able to accommodate maximum frequency and amplitudes at certain angles or operational displacements due to bellows' natural frequencies and bellows-to-interlock liner interactions. If bellows and interlock liner do interact, either can cause a failure by means of leaking, thus no longer being emission compliant.

While one solution might be provision of a larger design gap between the bellows and the interlock liner, that results in either a smaller interlock internal diameter and a decreased gas flow with exhaust restrictions, or a larger outside bellows diameter which is often not possible due to overall packaging constraints from surrounding components.

Accordingly, one objective of the invention is to provide a multiple component hot gas flowing hose with both frequency damping and abrasion prevention between components.

It is a further objective of the invention to provide a multiple component hot gas hose having an exterior bellows and a liner such as a metallic interlock structure together with intermediate components preventing the bellows from going into natural frequency resonance as well as preventing bellows-to-liner interaction or contact at any operating angle or displacement.

A further objective of the invention is to provide a multiple component hot gas flowing conduit having frequency damping and abrasion related failure prevention at any operating angle and displacement.

A further objective of the invention is to provide intermediate cooperating damping structures in a multiple component gas flowing conduit without abrasion of outer or inner components leading to failures by means of leaks.

A yet further objective of the invention has been to facilitate and improve assembly of a liner and a damper within an outer bellows sleeve.

SUMMARY OF THE INVENTION

To those ends, a preferred embodiment of the invention includes a multiple component conduit having a corrugated exterior bellows, an internal liner, such as a metallic interlock, and a dual component self-restraining subassembly comprising a damping cushion interfacing the bellows and an elastic spacing or biasing element disposed between the interlock liner and the damping cushion. This spacing element prevents contact of the damping cushion with the liner, while the liner and spacing element are held away from the bellows.

Once the multiple component conduit is assembled, the resulting fit of the damping cushion and the elastic spacing element is a compression fit, such that the spacing element provides and performs cushion support at all operating states of the multiple component conduit, both when fully extended, compressed or angled.

The combination of cushion and spacing element also damps out energy caused by the natural frequency of the bellows, thus preventing a bellows failure mode with the bellows natural frequency lining up with the natural frequency of the system in which the hose is installed.

In more detail, one embodiment of the spacing element includes narrow, elongated, discrete metallic elastic spacers, naturally curved and secured at ends, one or both, to the interlock liner. Elastic spacers of any suitable materials can be used. When the liner is extended, such as for assembly, the natural curve of the spacing elements flattens out, allowing the liner to be inserted into the bellows with the spacers moving into position under aligned dampers within the bellows. With the liner extension is decreased, the metallic elastic spacers spring radially outward to engage and bias the damper cushion radially outward in the associated bellows convolutions.

A similar embodiment includes a single, relatively short tube slid over the interlock or a strip wound completely or nearly completely around the interlock and secured to the interlock by fixing. Such embodiments are simple to install on the interlock and allow for clearance between the interlock and the spacer during assembly but in use provide sufficient interference during motion to damp the bellows resonance as well as obstructing the bellows to interlock or cushion to interlock interaction.

Preferably the damper cushion is an elongated member, T-shaped in cross-section. The damper may be of any other suitable shape. The preferred damper with T-shaped cross-section includes a radially extending portion in a bellows convolution and horizontal flanges underlying adjacent portions of the bellows convolutions lying adjacent the radially extending damper portion. The damper is thus preferably in strip form with ends proximate or abutting one another and the damper is disposed in circumferential orientation between the bellows and the liner. Preferably, the cushion protrudes out of the bellows convolution, extending inwardly past the root of the convolution, to prevent liner or spacer interaction to the bellows. Bellows and interlock are maintained in positions spaced from each other for all operating states, so there is no undesired abrasion therebetween, and bellows damping is accomplished.

Moreover, while a liner of known interlock construction is preferred, various other liners providing the functions described herein can be used. The terms "liner" and "interlock" as used herein are thus interchangeable, "interlock" being a liner or a specific liner construction.

Preferably and for example only, three such elastic spacers are placed about the interlock at 120° intervals. More or less spacers could be used. Alternatively, and for example only, it would be possible to use a strip, or tube (fully circumferential or nearly circumferential) as spacers. It would also be possible to use a spacer with clearance that is then bumped from the inside out or sized in from the outside bellows to obtain an interference fit. It would also be possible to use a cushion that has been formed with a void to fit a spacer strip to allow the use of less spacers and less cushion material.

A damper is disposed in selected positions along the bellows and as noted is each preferably circumferential in one piece, about the interlock.

This conduit will accept high frequency/amplitude inputs from the system in which it is installed while also absorbing some of this energy in the damper cushion to prevent the bellows from going into natural frequency resonance as well as preventing bellows to interlock interaction at any operating angle/displacement. Location of the damper cushions can be application specific, depending on the mode and deflection shape of the bellows and the interlock as well as the natural frequency of the bellows with respect to critical frequency of the system.

Thus an interference/compression fit between the damper cushion and the elastic spacing elements in the existing bellows and interlock architecture is provided while allowing clearance for manufacturability. The elastic nature of the spacing element achieves the necessary compression fit between the components in the assembled conduit. The elastic spacing elements perform and provide cushion support at all operating states (fully extended and compressed).

The damper and its axial location along the bellows also damps out energy caused by natural frequency of the bellows thus preventing a failure mode of the bellows natural frequency lining up with the natural frequency of the system in which it is installed.

Preferably, and for example only, the location of multiple damper cushions in one embodiment is at positions about ⅓ and ⅔ of the overall length (OAL) of the flexible bellows but damper position is not limited to other locations and number. In use, such a hot gas flowing, multiple component conduit may present several different natural frequencies depending on the vibrating environment in which it is used. For example, first (n1) and second (n2) natural frequencies and their respective mode shapes within a conduit are of concern when they exhibit in the operating range of the application. If the damper cushions are placed to address an n2 frequency, (such as at $\frac{1}{3}^{rd}$ and $\frac{2}{3}^{rd}$ locations of the overall length) then n1 will also inherently be addressed and affected as the OAL of the bellows is effectively changed and will shift the n1 frequency and mode shape as the OAL is now broken down to three (3) smaller sections (as at 0-⅓, ⅓—⅔, and ⅔ of OAL), with cushions constraining the OAL at $\frac{1}{3}^{rd}$ and $\frac{2}{3}^{rd}$'s of the overall length. These are demonstrated in the Figures, including that shown in FIG. 18.

The illustration in FIG. 18 shows a frequency graph of an n1 frequency and the lower illustration shows a frequency graph of an n2 frequency, with lines showing the ⅓ and ⅔ positions.

The expected frequency responses for any such assembly and the preferred damping positions are easily determined as well known in the art, and the disclosure herein is exemplary.

In alternative embodiments, the circumferential damper cushion (in T-shaped or other suitable cross-section) can be in one integral circumferential piece, or provided in a circumferentially oriented strip with two ends disposed proximate one another.

Also, a single integral elastic strip in a wave-form configuration can be used in place of the discrete elastic strips described above. In such embodiment, the outer crests of the wave form bias the surrounding damper outward.

Other alternative embodiments or modifications are contemplated. For example, the conduit may eliminate any outer layers of mesh or braid, or the conduit may include a bellows with outer layers of both mesh and braid, mesh only, or braid only. The bellows may be provided with or without a limited number of progressive tapered, or uniform progressive conduits, multiple dog bone shaped configurations and in single or multiple stages.

Either single or multiple dampers of varied configuration can be used.

The material of the dampers could be of any suitable materials, including metallic; polymer or fabric composition or a combination thereof.

Finally, a cushion can be spaced across a single convolution or a number of multiple convolutions, depending on the particular application addressed.

BRIEF DESCRIPTION OF THE DRAWINGS

FIG. 8B is a diagrammatic view of the invention illustrating the cushion of FIG. 8 in a tapered bellows;

FIG. 8C is a diagrammatic view of the invention of FIG. 8 but illustrating the damper cushion thereof in a dog bone shaped, non-tapered bellow configuration;

FIG. 11 is a diagrammatic view of an alternative embodiment of the invention and a "T"-shaped damper cushion as in FIGS. 2-4.

DETAILED DESCRIPTION OF THE INVENTION

Turning now to the drawings, it will be appreciated that many variations and embodiments of the components described are within the contemplation of the invention. For example, the drawings described above are illustrative of a variety of component structures and numbers thereof. Thus, it will be appreciated that variations and embodiments are described without limitation to other elements and features as will be appreciated. Without limitation, configuration of the damper cushions, elastic spacers, liners, bellows, over mesh or braids or other features may vary. Also, components of the invention with similarities to others in alternate embodiments bear the same identifying numbers.

Figure 1:
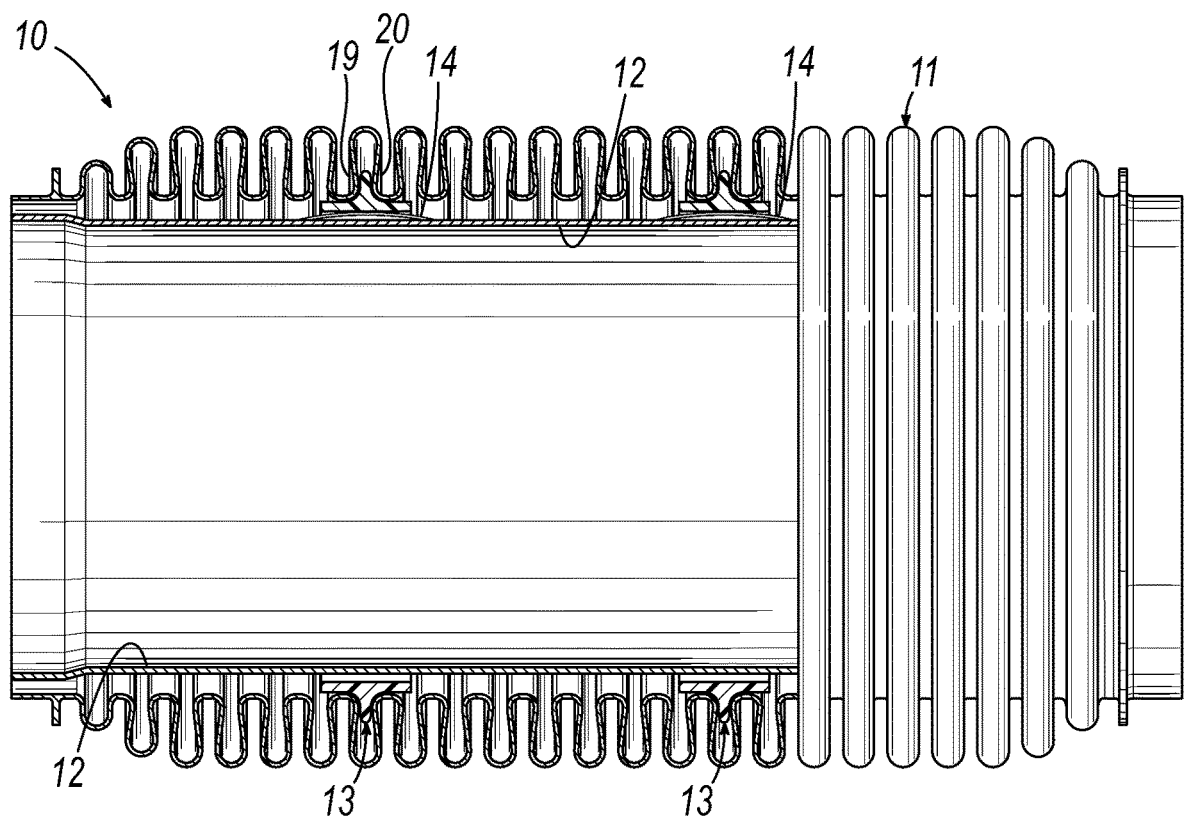
FIG. 1 is an elevational view of one embodiment of the invention in partial cross-section, illustrating damper cushions spaced at ⅓ and ⅔ along the axial or overall length of the tapered bellows.
Figure 1A:
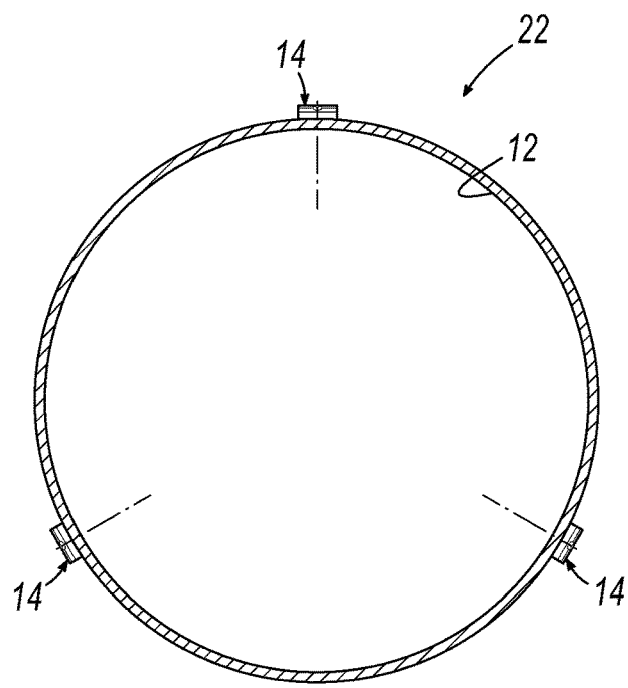
FIG. 1A is a diagrammatic illustrative view of a portion of the invention of FIG. 1 and showing an exemplary 120° spacing of the elastic spacers about a liner.
Figure 1B:
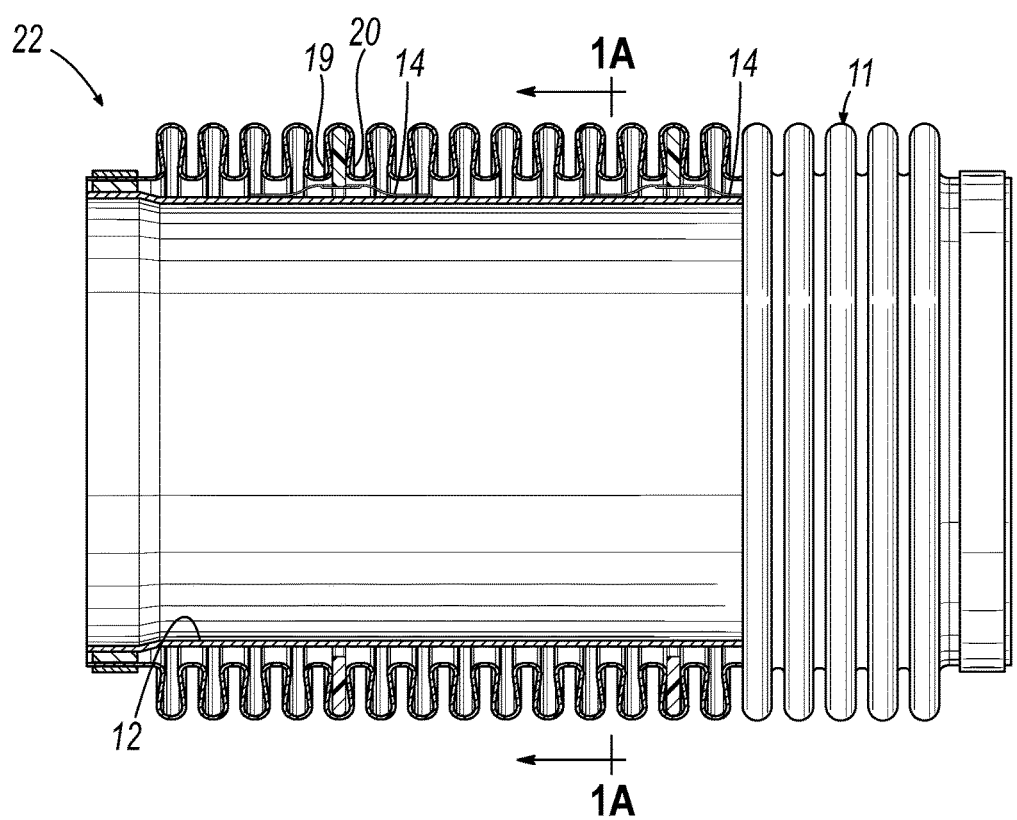
FIG. 1B is a diagrammatic view as in FIG. 1 but showing a non-tapered bellows.
Figure 7:
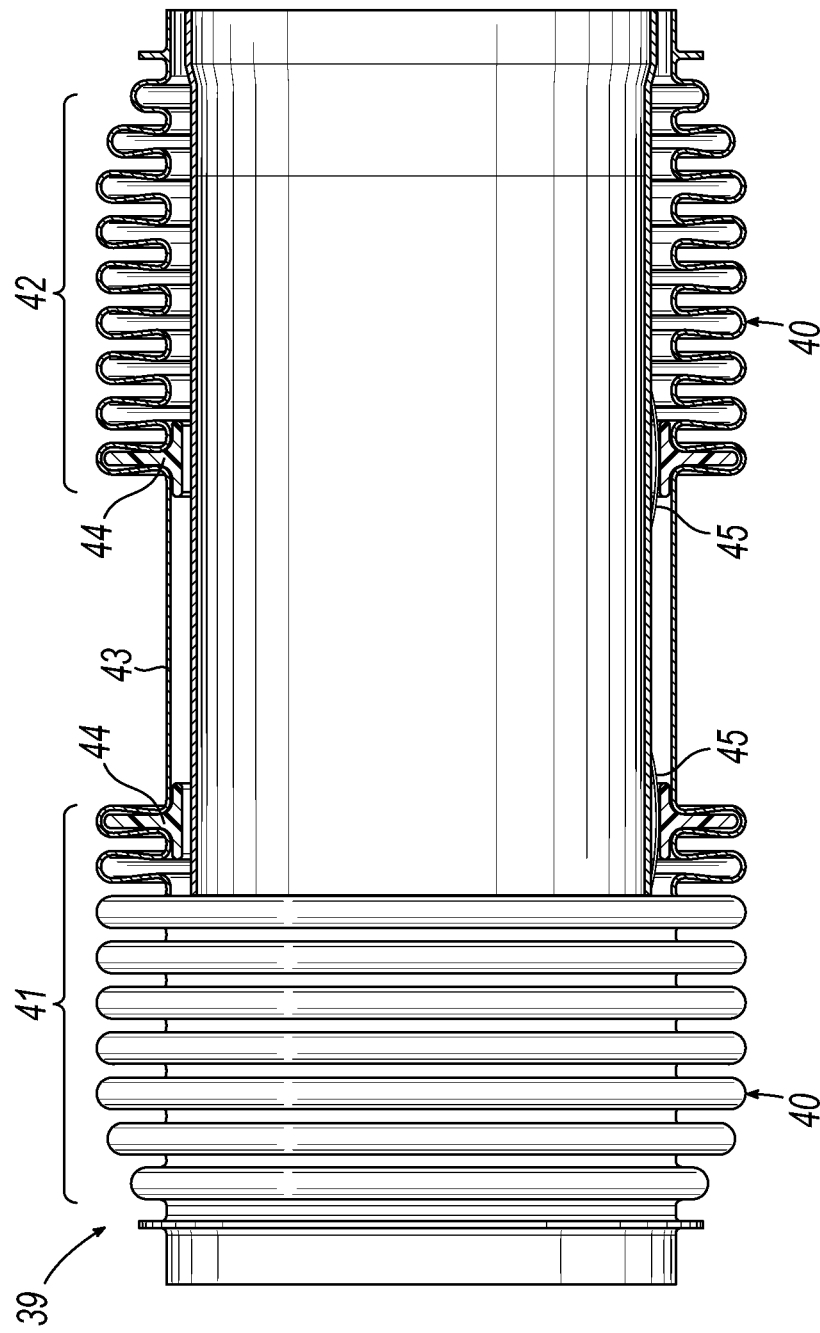
FIG. 7 is a diagrammatic illustration in cross-sectional view of a conduit according to the invention but where the segments of bellows convolutions are discontinuous or spaced apart in a "universal" dog bone shape bellows configuration.

A preferred multiple component conduit 10 in FIG. 1 includes a flexible bellows member 11, a damper 13, an expandable interlock liner 12 and a plurality of metallic, elastic spacers 14 secured at ends to liner 12. Liner 12 may be of any suitable configuration, such as a metallic interlock structure. An example of such interlock as seen in FIGS. 1 and 1A of U.S. Pat. No. 9,970,578, incorporated herein by express reference. Liner 12 is preferably bendable and expansible linearly as will be discussed, As shown, in FIG. 1, member 11 is convoluted throughout its overall length (see FIG. 11) (excluding its connecting ends) or alternatively as shown in FIG. 7, may comprise a smooth-wall tube having convoluted portions proximate each end (a "dog bone" or "universal" bellows). Both Figs. illustrate a bellows with convolutions tapering inwardly at conduit ends. While in FIG. 1B, there is illustrated a conduit 22 wherein bellows includes uniform convolutions.

Figure 3:
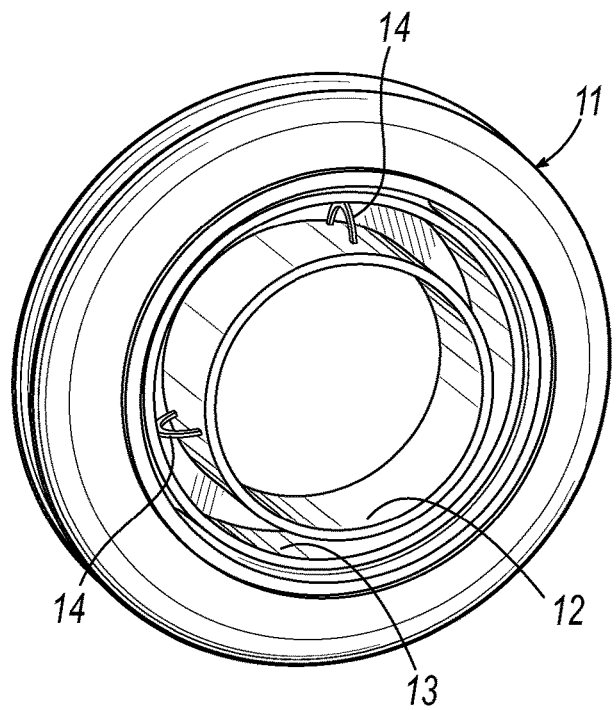
FIG. 3 is a photographic isometric view of components of FIG. 2 showing the extension of the elastic spacers in use.
Figure 4:
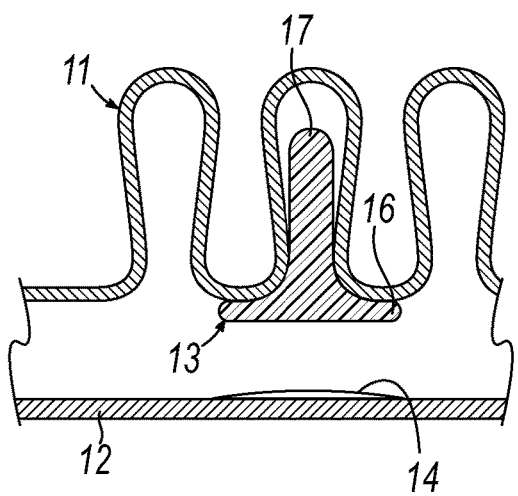
FIG. 4 is a view similar to FIG. 2 but illustrating an interlock liner in an extended state, with the elastic spacer flattened out for assembly into a bellows with damper cushion radially spaced from the elastic spacer.
Figure 5:
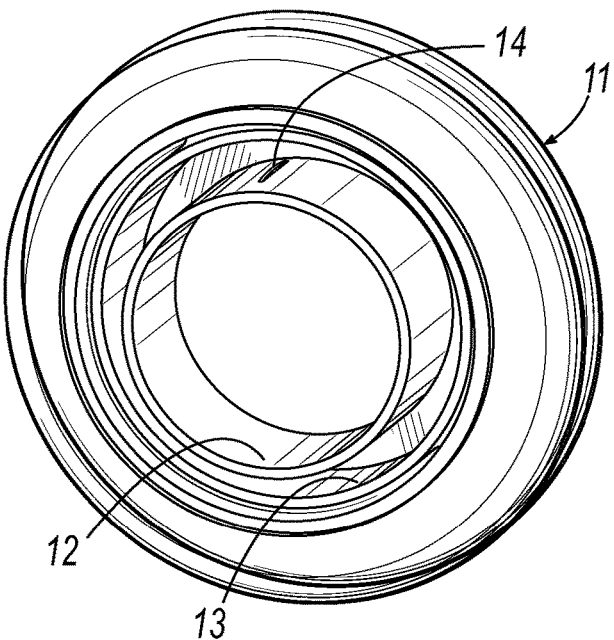
FIG. 5 is a photographic isometric view of the components of FIG. 4 during assembly.
Figure 2A:
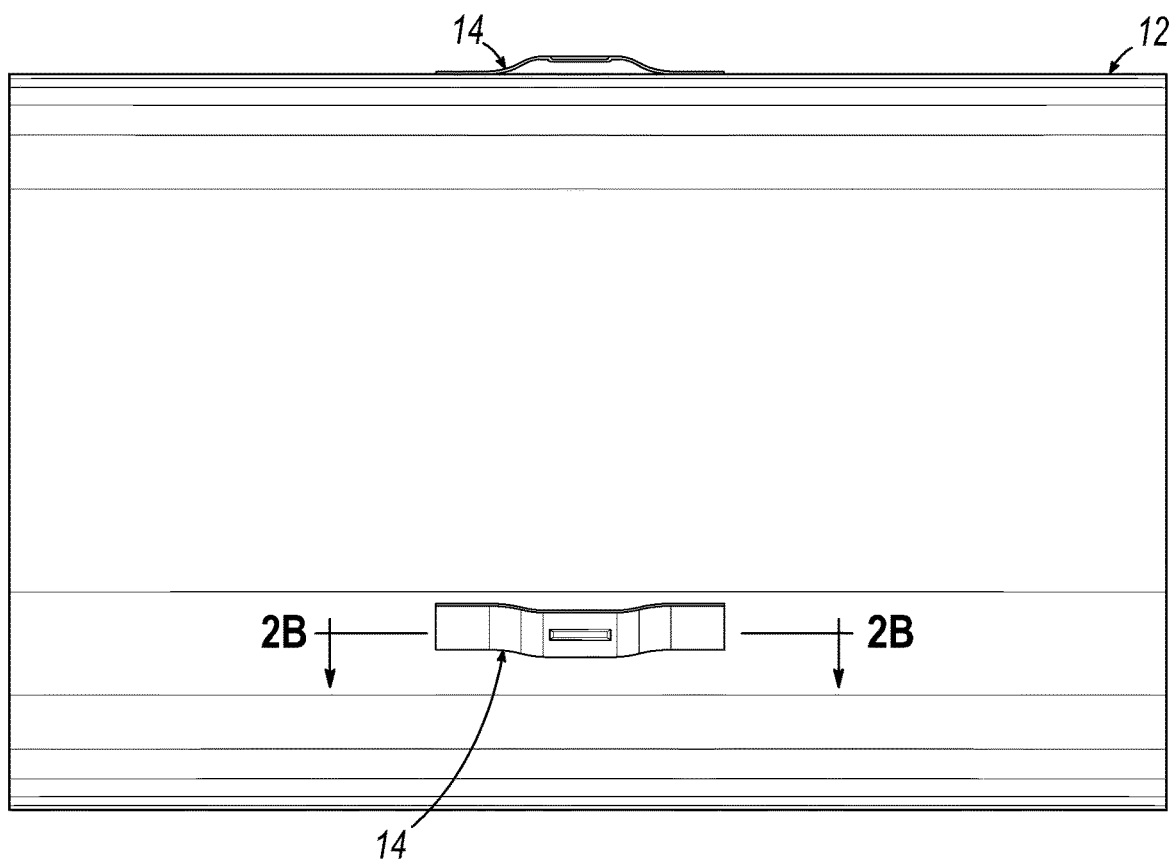
FIG. 2A is an elevational diagrammatic view of separate elastic spacer elements attached around an interlock liner and extending radially therefrom, with the bellows and damper omitted for clarity.
Figure 2B:
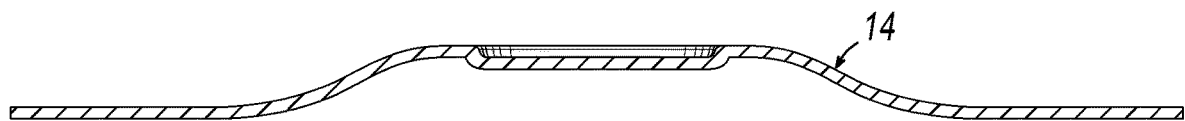
FIG. 2B is a diagrammatic cross-sectional view of an elastic spacer of FIGS. 1, 2 and 2A.
Figure 2C:
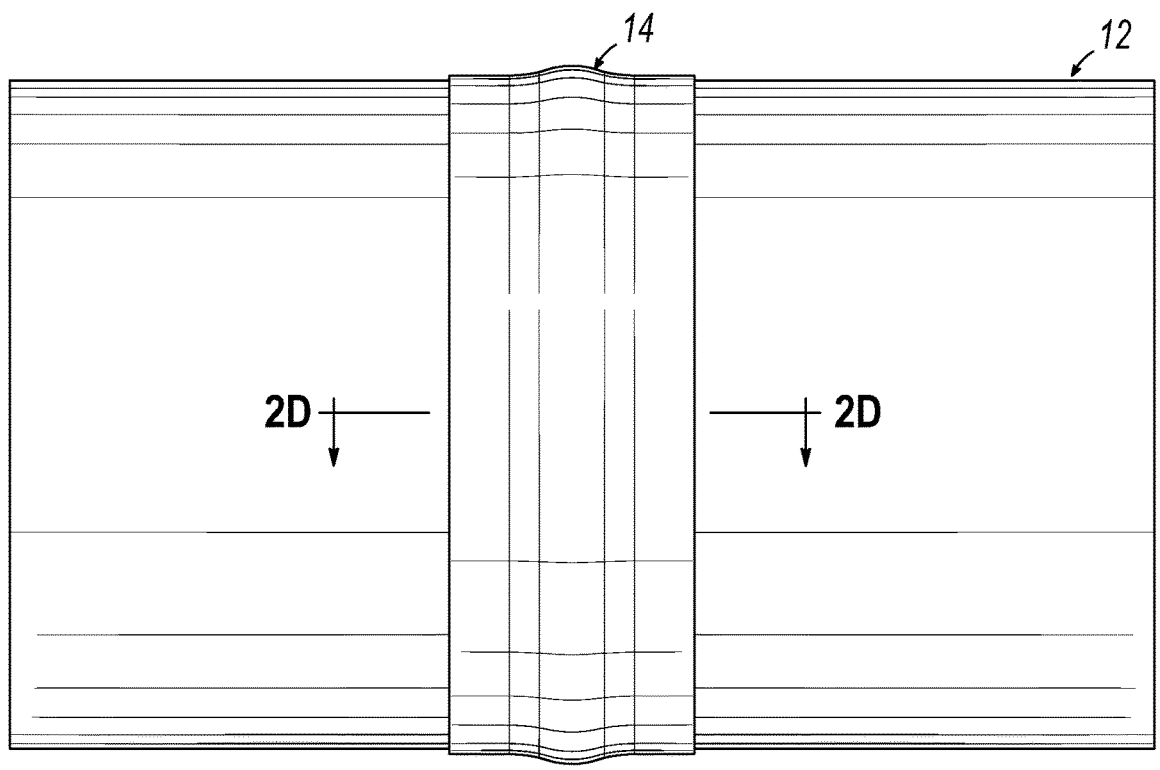
FIG. 2C is a diagrammatic view of an alternate integral elastic spacer in the form of a strip wrapped about an interlock and having across section as in FIG. 2B; alternatively the strip 14 can be of any suitable geometry, and even flat, sufficient to bias damper outwardly.
Figure 2D:
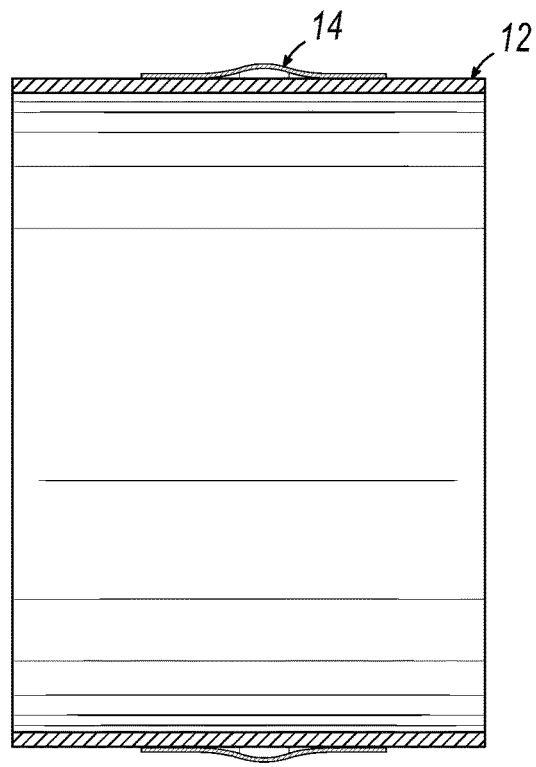
FIG. 2D is a cross-sectional view taken along lines 2D-2D of FIG. 2C.

An alternative "dog bone" would have multiple sections of convolutions with small sections of unconvoluted or smaller convolutions between them, as in FIG. 7. Details of the components are illustrated in the cross-sectional views of FIG. 2 (assembled form) and FIG. 4 (during assembly condition). FIGS. 1A, 3 and 4 illustrate the position of dampers 13 and elastic spacers 14 at 120° about the conduit 10. Any suitable number of spacers 14 may be used, and the combined spacers 14 with dampers 13 may be located about the conduit at a variety of angular positions, the 120° disposition in the Figs. being illustrative.

One form of damper 13 as in FIGS. 1, and 2-5, and 11 is an elongated strip having a flange 16 and a radially projecting element 17, with the flange 16 disposed under adjacent convolutions 19, 20 of bellows 11 (FIG. 1) and radial damper projection 17 extending into the radially, outwardly extending bellows convolution therebetween. This strip of either continuous or discontinuous damper material is circumferentially oriented interiorly of bellows 11. Thus damper 13 is preferably in an annular circumferential strip form, while in one embodiment the spacers 14 are separate components (FIGS. 1A, 2A, 3 and 5).

Figure 2:
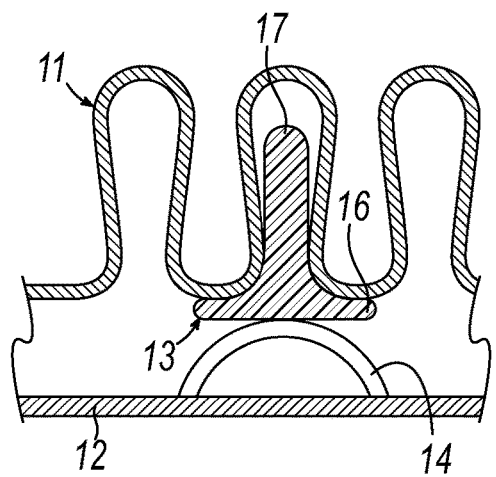
FIG. 2 is a cross-sectional diagrammatic view of a portion of the invention of FIG. 1 illustrating an interlock liner, elastic spacer, damper cushion and bellows in assembled state.

FIG. 2 illustrates the components in assembled form, with strips 14 biasing damper 13 into the bellows and preventing bellows to liner contact.

FIG. 4 illustrates conduit 10 in assembly condition, where liner 12 is elongated in such a way as to cause elastic strips 14 to flatten (due to their ends being secured to a fully-extended liner). In this condition, the extended liner 12 is assembled into the bellows and internally of damper 13. Upon relaxation of the liner 12, elastic elements 14 spring outwardly to bias damper 13 into the bellows and hold bellows 11 away from liner 12.

Figure 6:
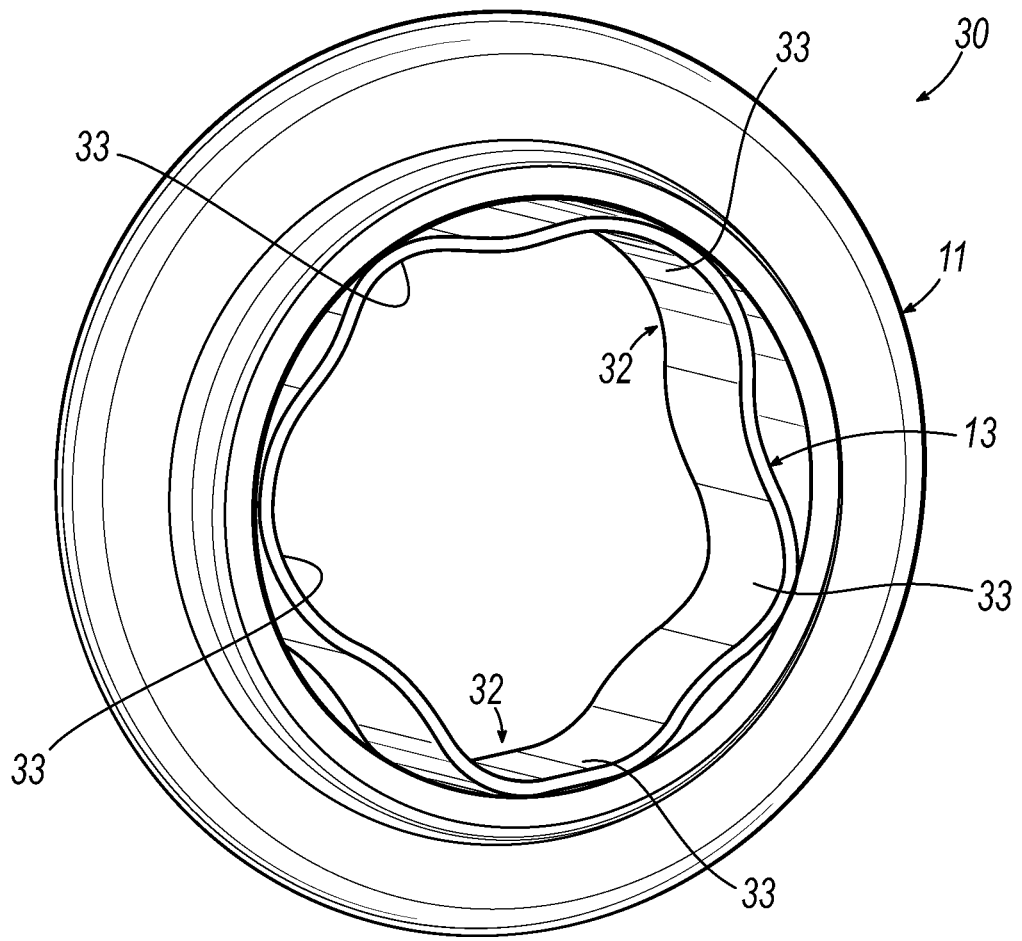
FIG. 6 is a photographic isometric view of an alternative elastic spacer in tubular wave form.

An alternative embodiment conduit 30 illustrated in FIG. 6 includes similar bellows 11 and damper 13 but, instead of elastic members 14, includes a spring or wave-form tubular element 32, having outwardly extending crests 33 engaging a dampers 13 and urging them radially outward into the bellows 11, and preventing bellows-to-liner (not shown) contact. In manufacture, a guide member is used to facilitate assembly as will be appreciated. Tube 32 can be of any suitable geometry, and even flat, sufficient to bias damper 13 outwardly.

A variety of any suitable materials may be utilized in provision of the components herein.

FIG. 7 illustrates a multiple component hot gas flowing conduit 39 such as described above but where the preferably one-piece outer bellows component 40 is not continuously convoluted but comprises convoluted portions 41, 42 proximate each end, connected integrally by a smooth-wall tube 43, in one or multiple sections and may be smooth, or provided with ribs or convolutions. With two bellows sections at each end of a conduit, a dog bone shaped conduit is formed.

Dampers 44 as described above, together with elastic elements 45, also as described above, are disposed in conduit 39 as shown. Such dampers 44 are illustrated at ⅓ and ⅔ of the overall length of conduit 39.

A major benefit of the invention is the removal of abrasion between the functional components of the interlock and bellows. Prior art devices allow for the cushion to move relative to the bellows causing abrasion and eventually a leak as well as allowing the cushion to move relative to the interlock causing abrasion and eventually a failure of the interlock. The invention places a surface designed to be abraded (like a wear plate) on the interlock that would not lead to interlock failure and keeps the cushion stationary with respect to the bellows to remove all abrasion between the cushion and the bellows. The invention is a wear or abrasion free device on all critical components.

These embodiments of the invention provide the benefits and advantages described above and meet the stated objectives. Various modifications and features of the invention, in addition to those described herein, will be readily appreciated by those of ordinary skill in the art without departing from the scope of the invention and applicant intends to be bound only by the claims appended hereto:

It will be appreciated that the foregoing written description and related Figures diagrammatically illustrate broad features of the invention, while further details and alternative embodiments of the invention are also shown therein and in FIGS. 8-16, with like parts bearing like identifying numbers.

Figure 8:
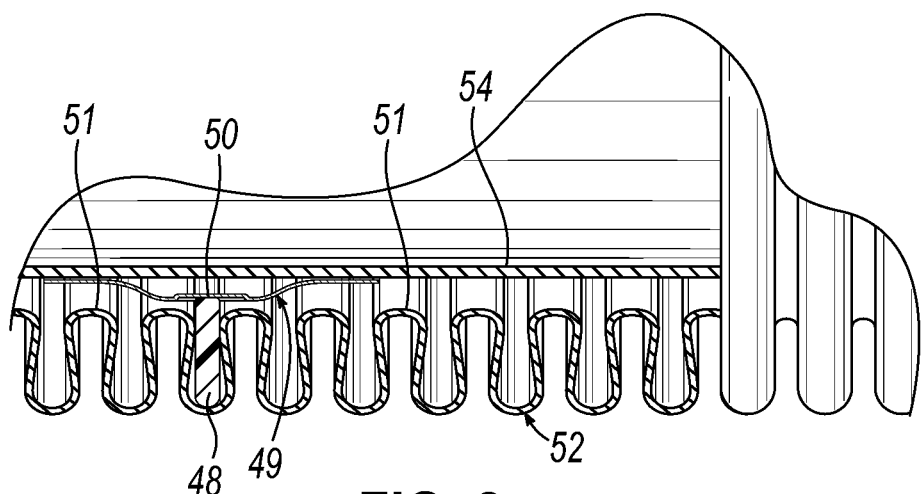
FIG. 8 is a diagrammatic cross-sectional view of one preferred form of the invention illustrating liner, bellows, elastic spacer and damper cushion having a length longer than the depth of a convolution in which it resides, thus an interior end closer to the liner than as illustrated in FIG. 1.
Figure 8A:
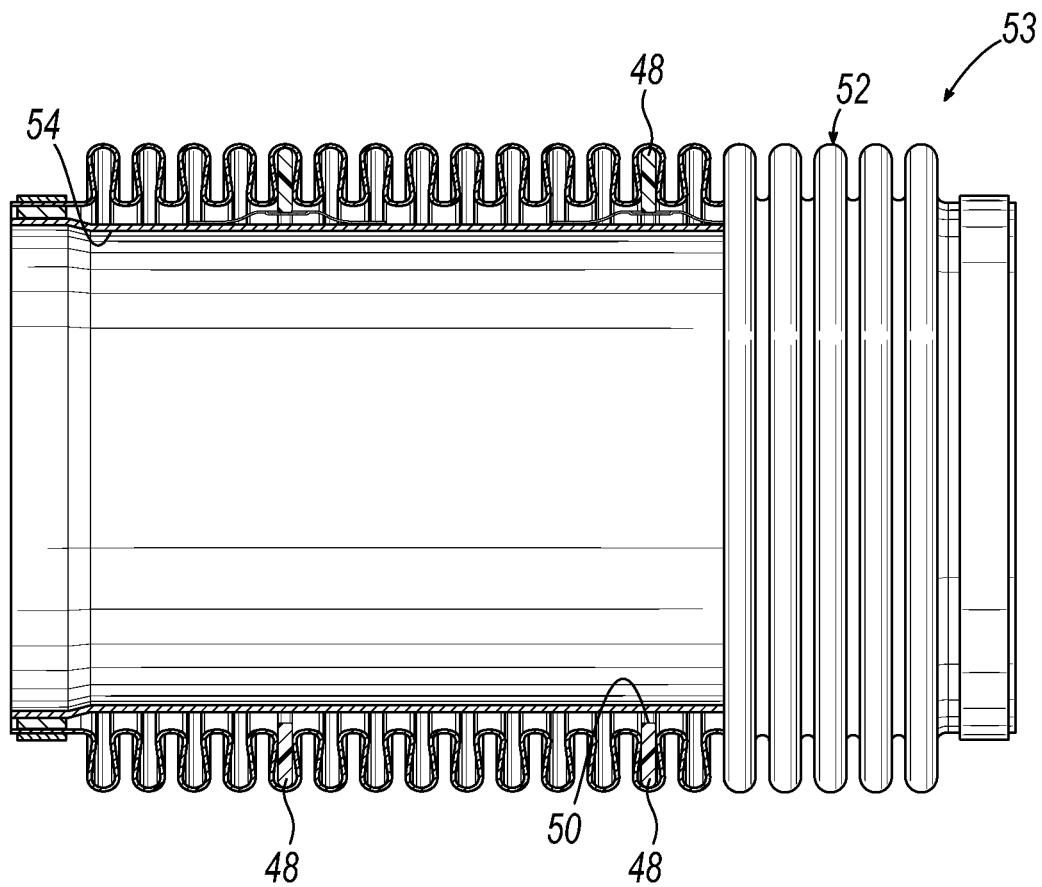
FIG. 8A is a diagrammatic view of the invention of FIG. 8 illustrating damper cushions at ⅓ and ⅔ of the conduit overall length in a non-tapered bellows.
Figure 8D:
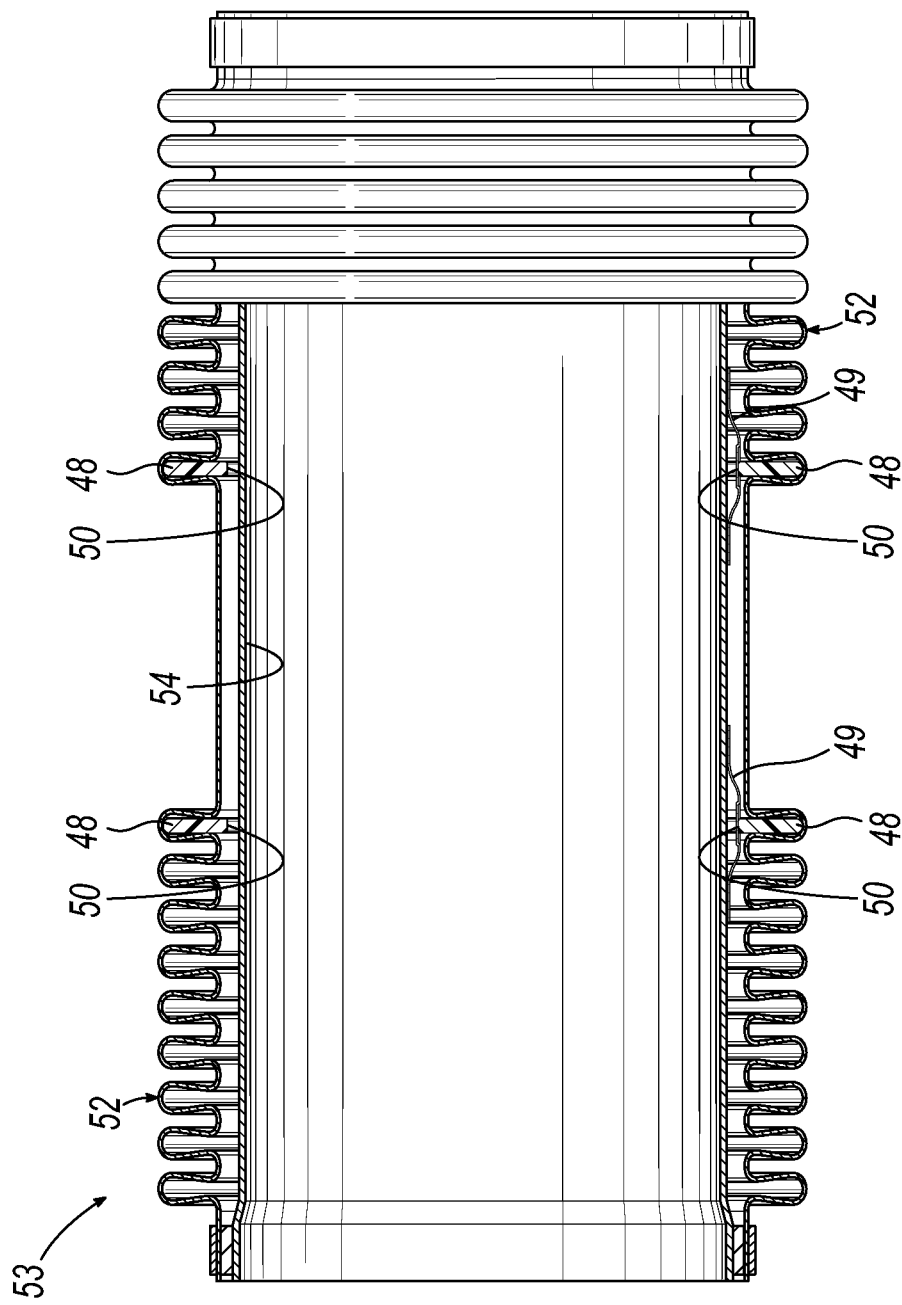
FIG. 8D is a diagrammatic view of the invention of FIG. 8 but illustrating the conduit in dog bone configuration.
Figure 10:
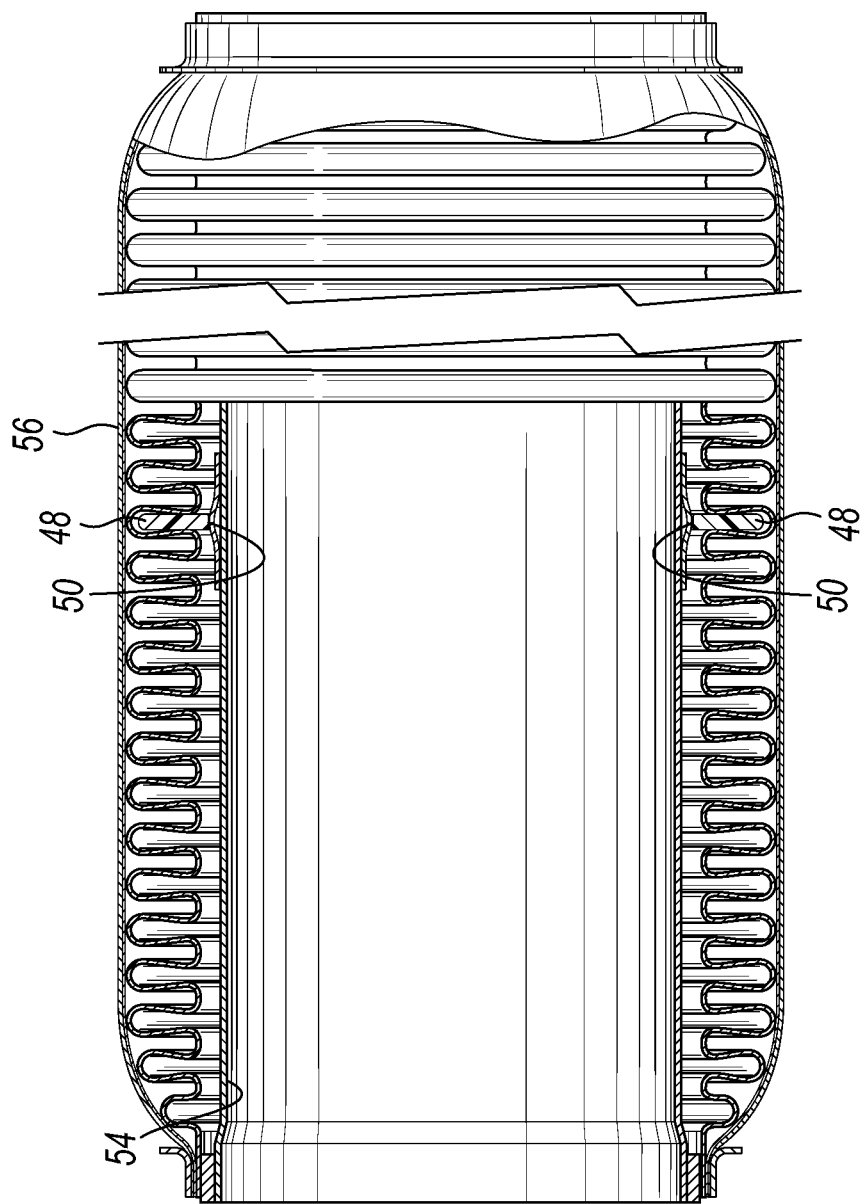
FIG. 10 is a diagrammatic view of the invention illustrating use of an optional sleeve of mesh or overbraid.
Figure 12A:
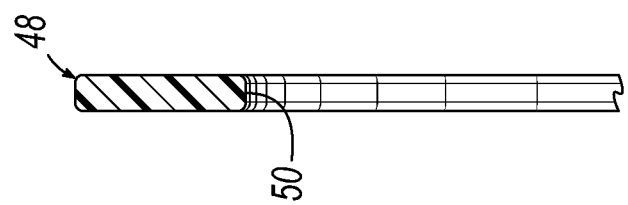
FIG. 12A is a cross-sectional view taken along lines 12A-12A of FIG. 12.
Figure 12:
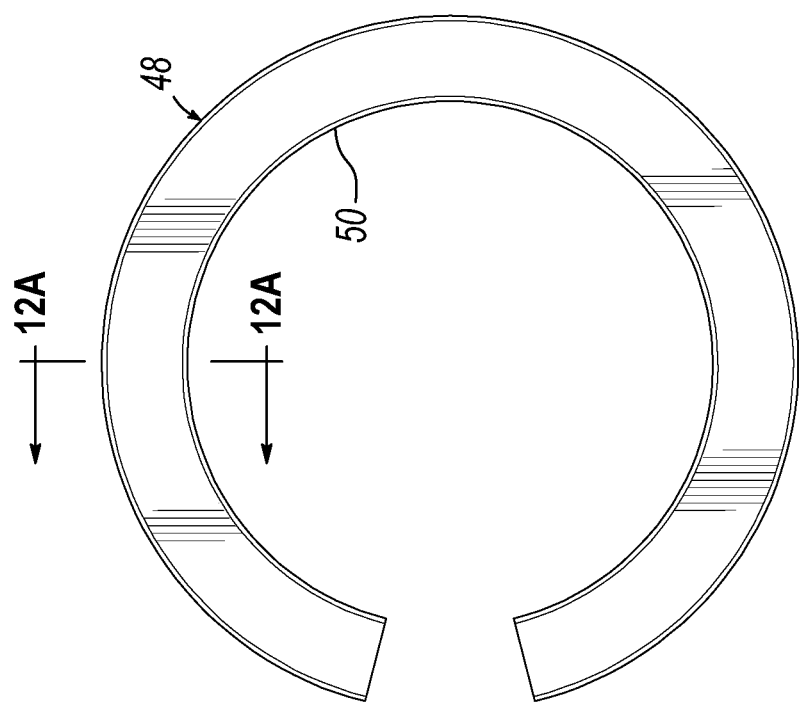
FIG. 12 is a diagrammatic view of an alternative damper cushion.

With attention to FIGS. 8 and 10, there is illustrated an alternative damper 48 mounted on elastic spacers 49, functioning similarly to dampers 13 and spacers 14 noted above. However damper 48 is also an annular strip for mounting directly on spacers 49 as shown more particularly in FIGS. 12 and 12A. Damper 48 may be in the form of a continuous, but preferably discontinuous strip having disconnected ends (FIG. 12). An inner edge 50 of damper 48 extends inwardly beyond the inner curves 51 of adjacent convolutions, as shown in FIG. 8A, 8B, to further support the bellows 52 of a conduit 53 away from liner 54. As illustrated, this embodiment includes a conduit of uniform convolutions (FIG. 8), of tapering convolutions (FIG. 8B), of dog bone convolution with a single central convolution (FIG. 8C) and of plain dog bone configurations (FIG. 8D).

Figure 9:
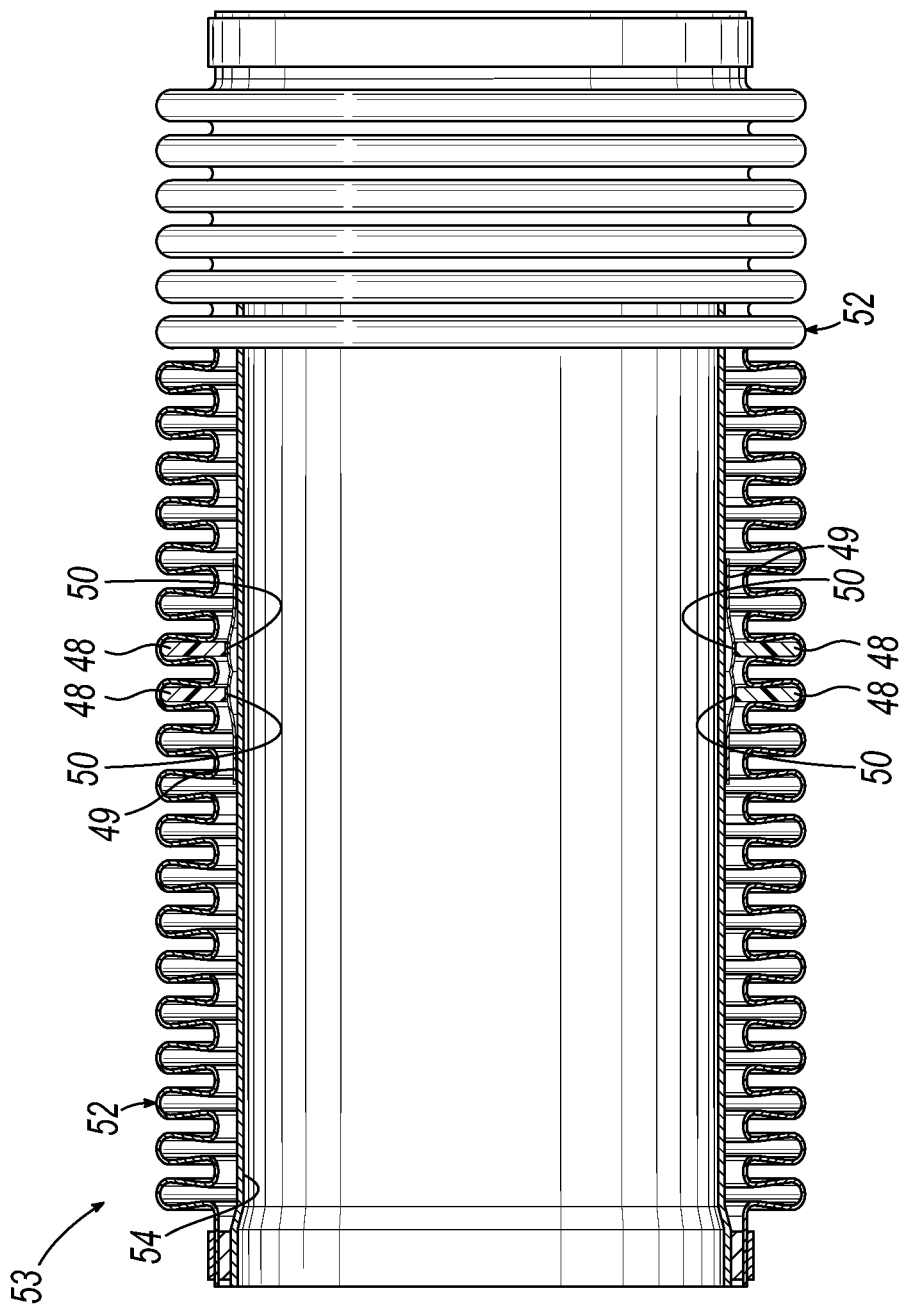
FIG. 9 is a diagrammatic view of an alternative embodiment of the invention illustrating two adjacent damper cushions, each biased by the same elastic spacer in a non-tapered bellows.

FIG. 9 illustrates an alternative embodiment wherein a set of two dampers 48 are mounted in adjacent convolutions of bellows 52 on a common elastic spacer 49.

FIG. 10 illustrates a conduit such as in FIG. 8B, with tapered convolutions but having an outer sleeve 56 of mesh or overbraid. Dampers 48 are optionally shown here as in FIG. 8.

FIG. 11 illustrates an embodiment of the invention as in FIGS. 2-4.

Figure 11A:
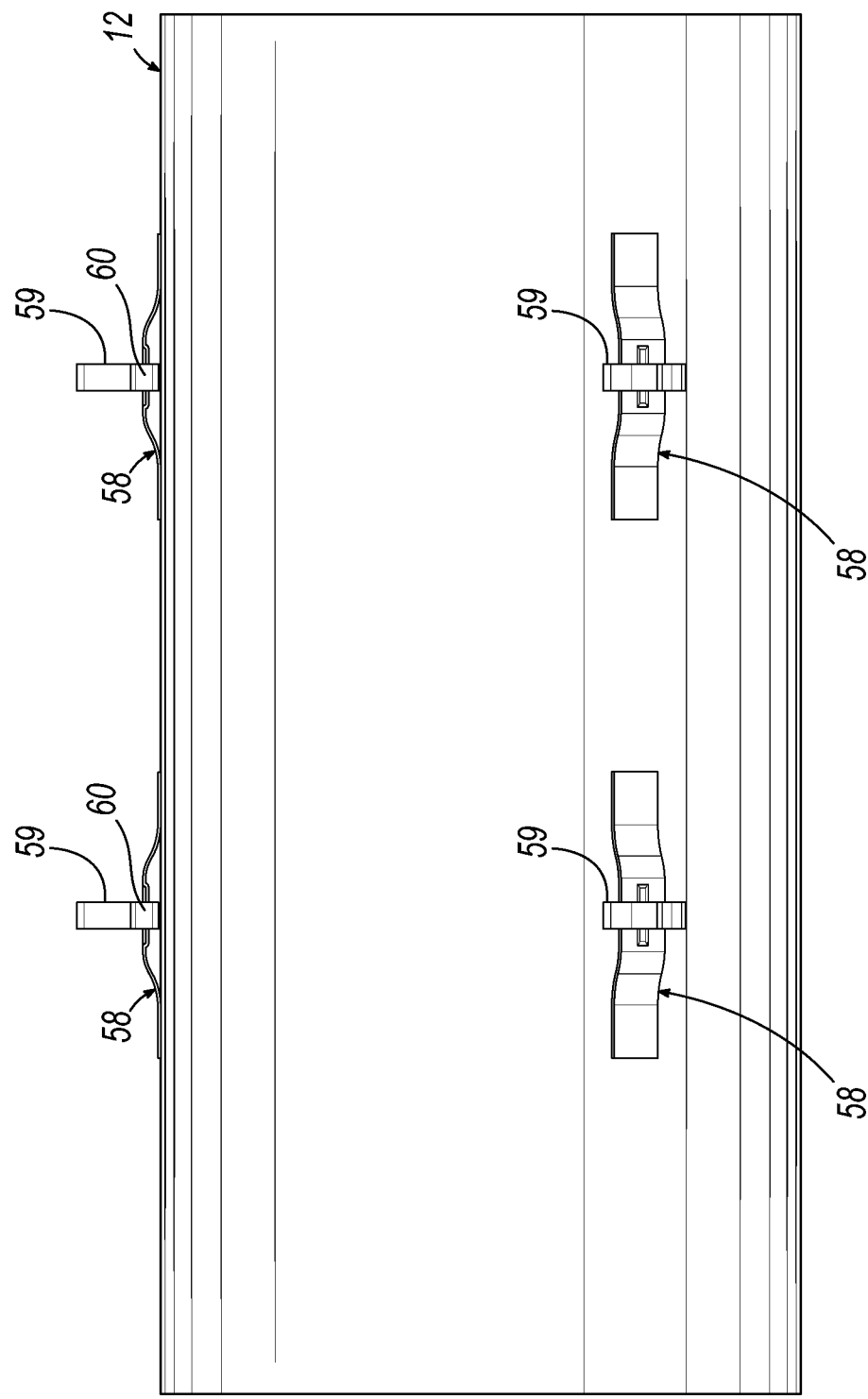
FIG. 11A is a diagrammatic view of the elastic spacer and T-shaped cushion of FIG. 11.

In slight variation of FIG. 11, FIG. 11A shows elastic spacers 58 mounting dampers 59 sized to extend into bellows convolutions, but constructed to fit in spacers 58 without the rotation of the dampers 59. The dampers 59 have legs 60 fitting into the spacers carrying the dampers.

Figure 13:
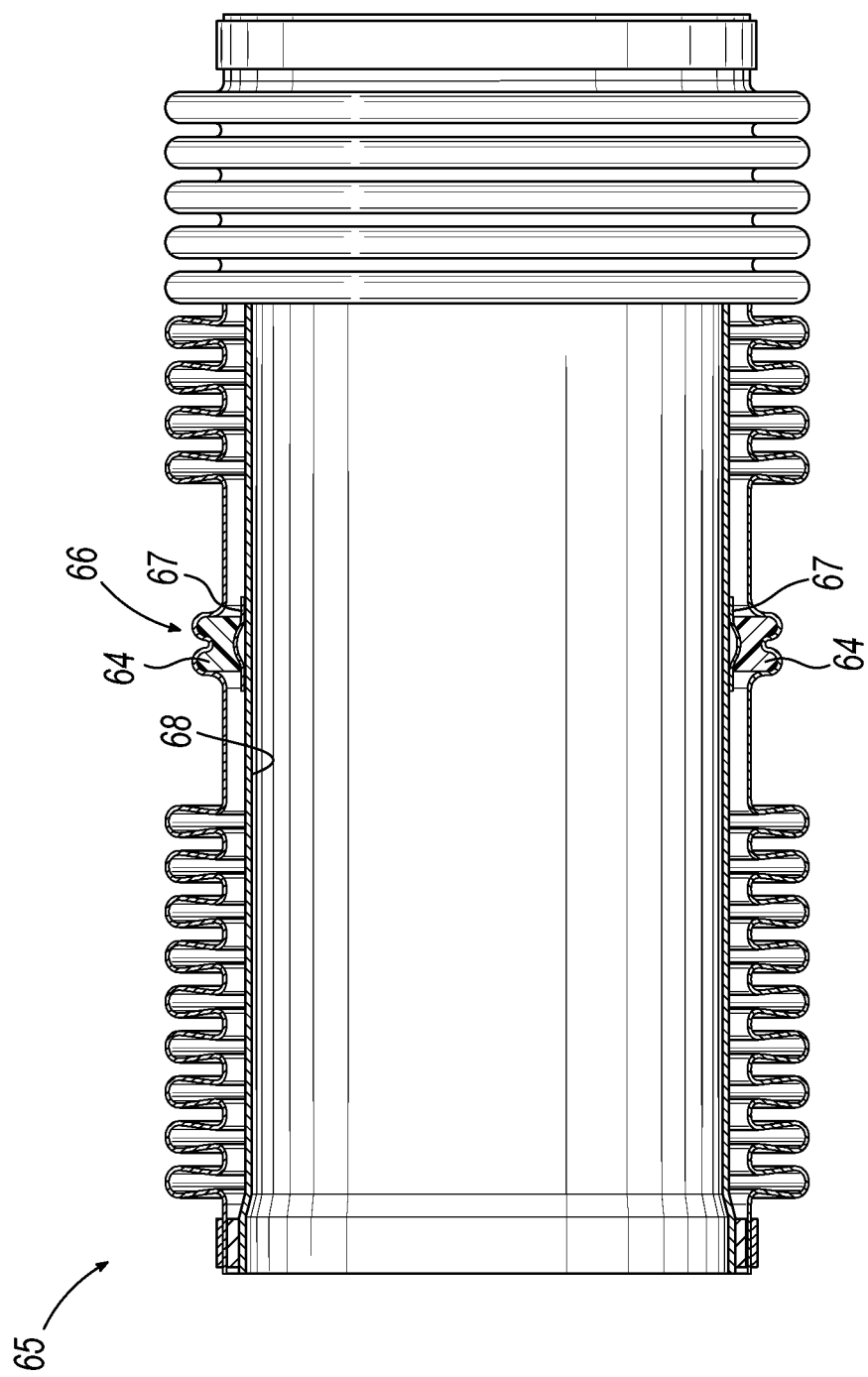
FIG. 13 is a diagrammatic view of the invention illustrating an integral, one-piece, monolithic damper cushion disposed in side-by-side center convolutions of a conduit having optional convolution segments separated from the center convolutions by smooth walls.

An alternative damper 64 is illustrated in FIG. 13 for particular use in a dog bone shaped conduit 65 having a central, dual, bellows convolution 66. Spacer 67 is mounted on interlock 68 for supporting integral damper 64 urging it outwardly into convolutions 66 and maintain the bellows away from interlock 68. Convolutions 66 are preferably sized also to add preload of damper 64 toward interlock 68.

Figure 13A:
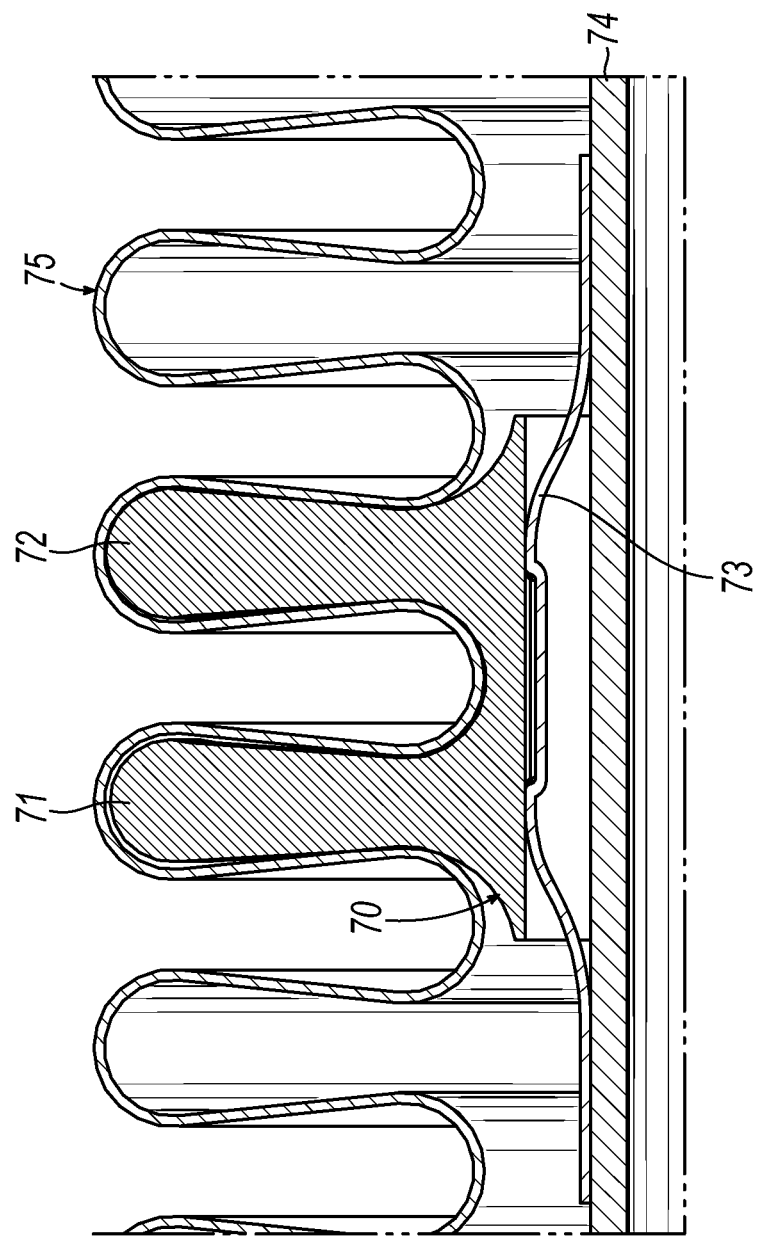
FIG. 13A is a diagrammatic view of an alternative one-piece, integral, monolithic damper cushion for side-by-side convolutions of a bellows.

A further alternative of a dual, integrated damper 70 is illustrated in FIG. 13A where the integral one-piece, monolithic damper 70 includes radially outwardly extending projections 71, 72 mounted on spacer 73 to a liner 74 of a conduit of any bellows 75 and liner configuration. Elastic spacers 73 bias the damper 70 outwardly into the convolutions of bellows 75.

Figure 13B:
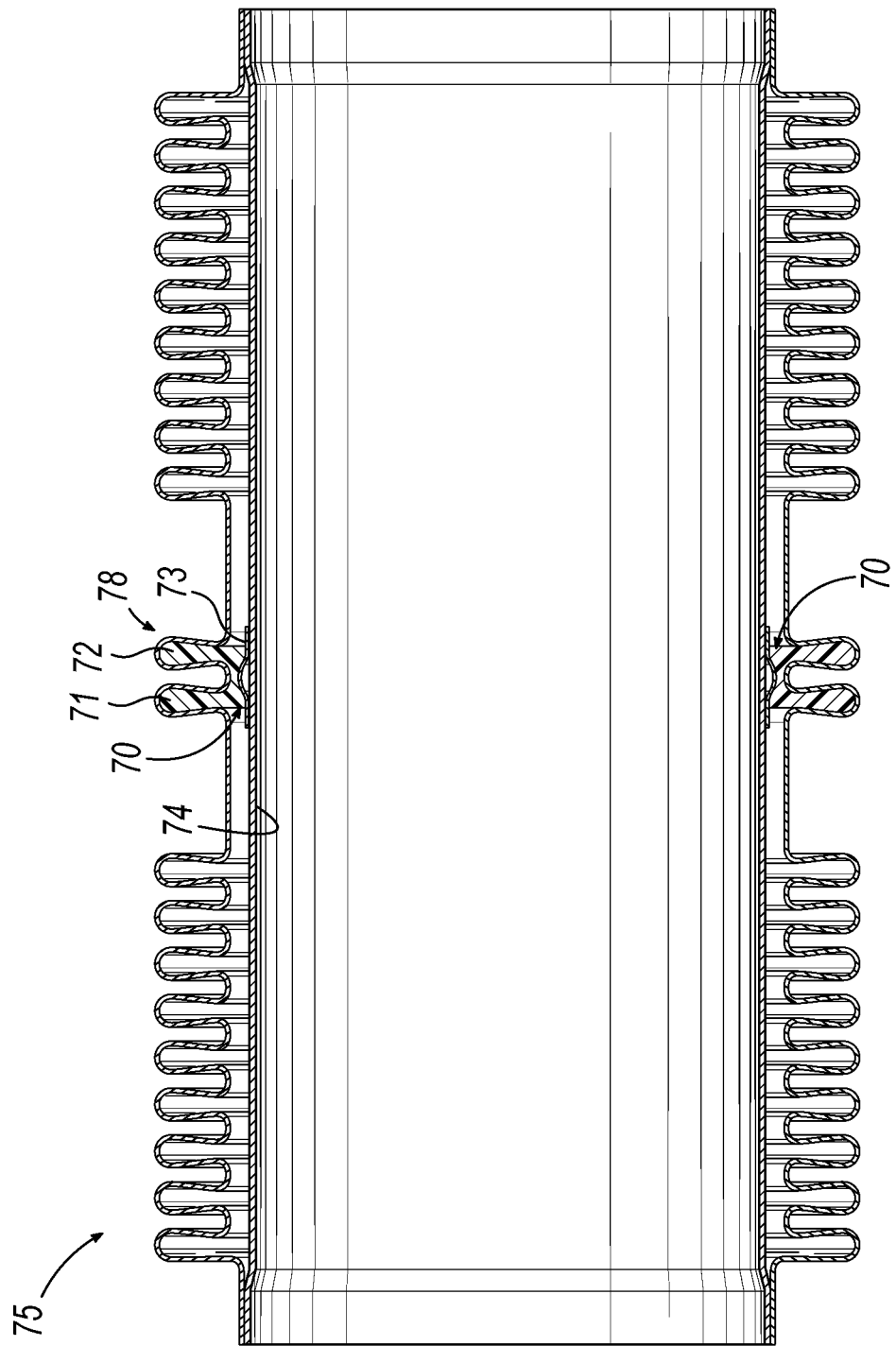
FIG. 13B is a diagrammatic view of an alternative one-piece, integral, monolithic damper cushion having extending into side-by-side convolutions of bellows.

FIG. 13B illustrates a conduit 75 having a combination of the dual damper 70 with a central dual convolution set 78 of a dog bone-shaped bellows conduit similar to that of FIG. 13A as a further alternative embodiment of the invention.

Figure 14:
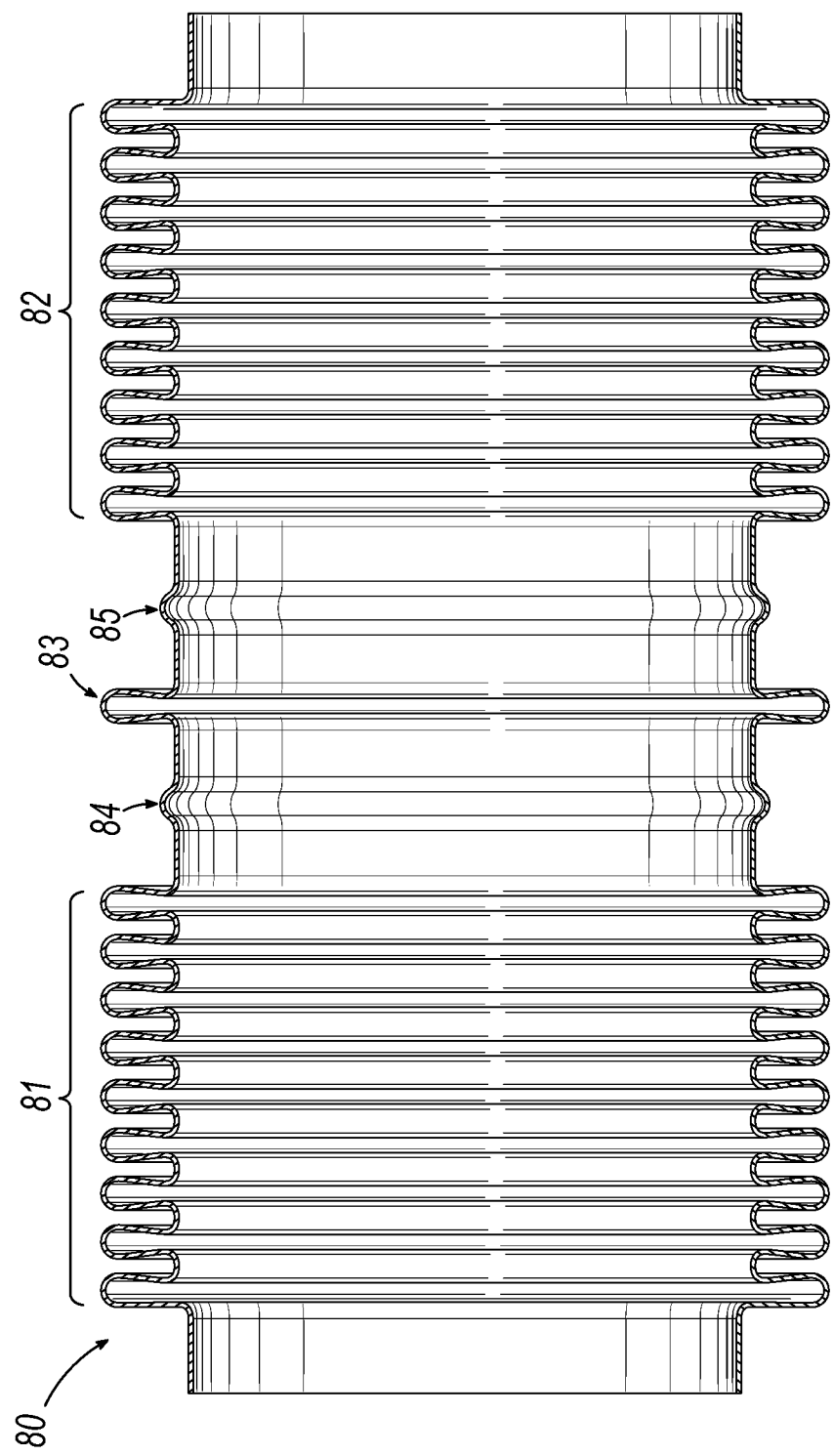
FIG. 14 is a diagrammatic view of a bellows of the invention illustrating a bellows having a plurality of convolution segments.

FIG. 14 illustrates an alternative conduit 80 having a dog bone-like convolution segments 81, 82, a central convolution 83 and two slighter convolutions 84, 85. Dampers and elastic spacers, not shown but such as above described, are disposed as desired within selected convolutions. The convolutions 83, 84 and 85 provide stiffness or rigidity in the conduit 80 between convolution segments 81, 82.

Figure 15:
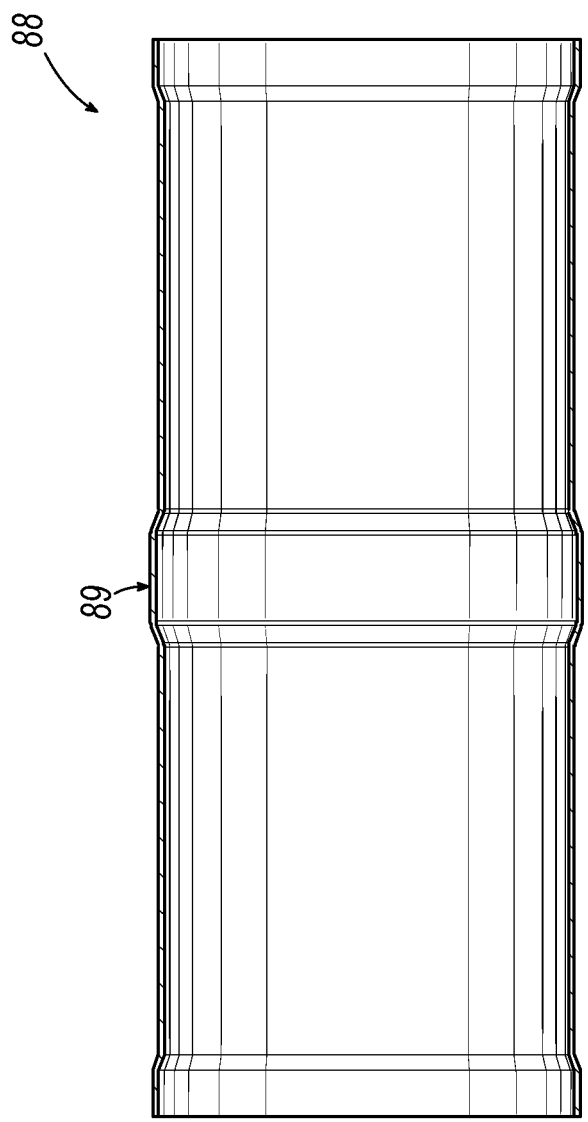
FIG. 15 is a diagrammatic view of an alternative interlock liner having a central circumferential projection.

FIG. 15 illustrates a liner 88 having a bumped out central portion 89 radially outwardly extending from the surface of liner 88 on each side. When used in a conduit, enlarged portion 89 is aligned with elastic spacers and dampers, not shown here but as above described, to provide further outward bias and spacing of the spacers and dampers than may be positioned on the liner along non-expanded line wall surfaces.

Figure 16:
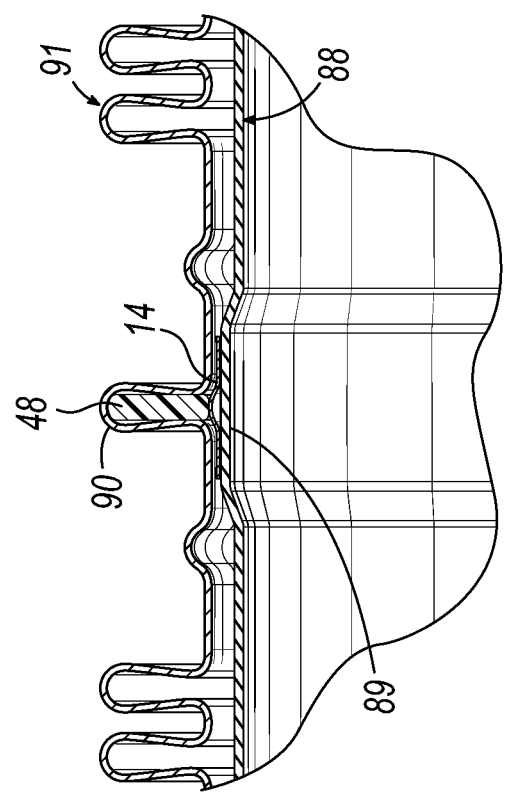
FIG. 16 is a diagrammatic view of an alternative embodiment of the invention having a liner as in FIG. 15 provided with a damper cushion as in FIG. 12 and elastic spacer as in FIG. 2A and aligned with the central circumferential projection of FIG. 15.

As an example, FIG. 16 does illustrate liner 88 with bumped out central portion 89 supporting an elastic spacer 14 mounting a damper 48 thereon. Damper 48 extends into a convolution 90 in surrounding bellows 91, all as previously described.

It will be appreciated that the invention described may take multiple forms, all with a liner, a damper extending into one or more bellows convolutions, and an elastic spacer biasing the damper into the bellows convolutions. Various damper, spacer, liner and bellows convolution configurations and positions are thus contemplated. Significantly, components of the embodiments are desirably isolated from abrasion, one from the other.

Figure 17:
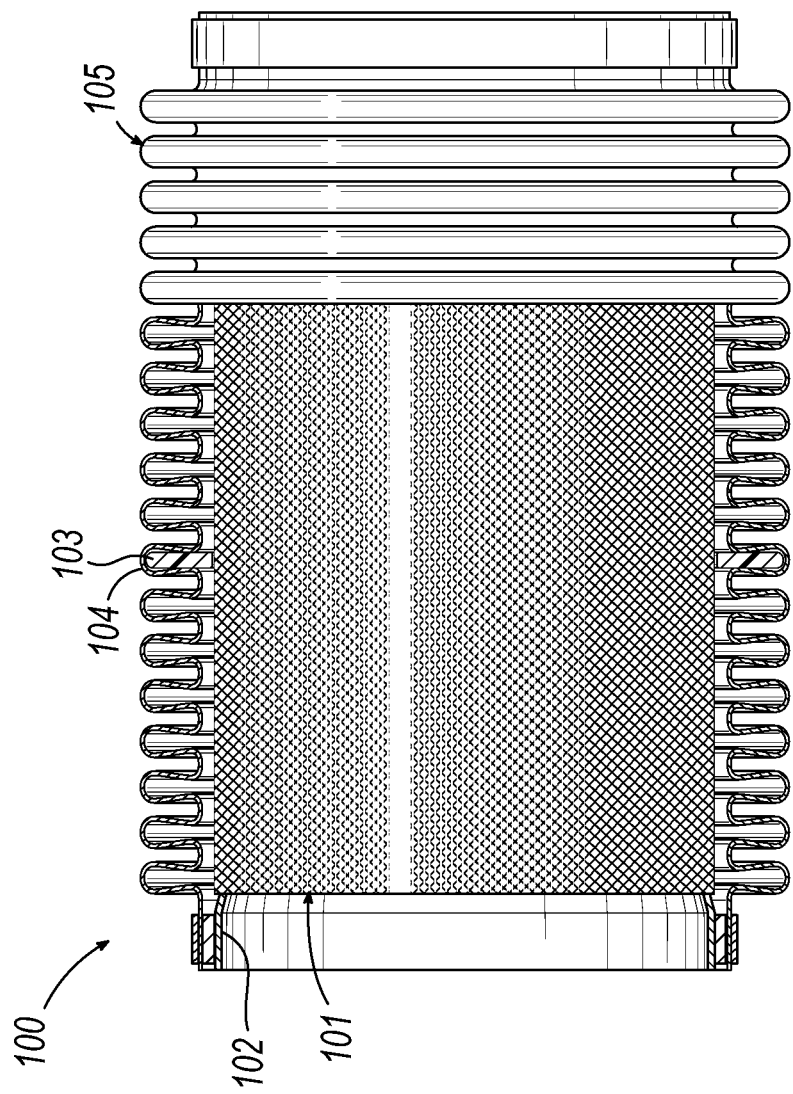
FIG. 17 is a diagrammatic view of an alternative embodiment of the invention wherein a sleeve is wrapped about the conduit liner.
Figure 18:
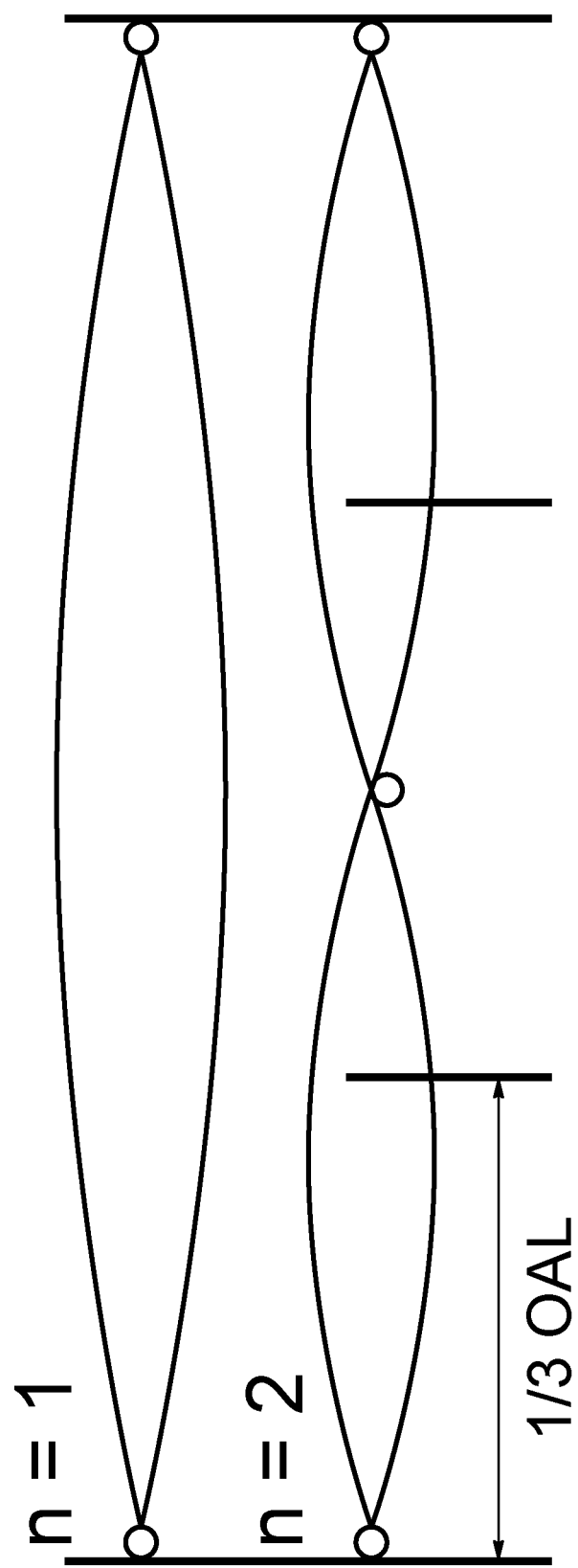
FIG. 18 is an illustration of n1 and n2 frequency graphs.

A further alternative embodiment of the invention is diagrammatically illustrated in FIG. 17. Here, the elastic spacers described above are omitted. Instead, in a conduit, a mesh or braid sleeve 101 is oriented directly on and around an interlock liner 102. Dampers 103 of any suitable configuration as described above are placed on sleeve 101, and extend into associated convolutions 104 of bellows 105.

While a braid or mesh sleeve of any suitable composition or structure as illustrated in FIG. 17 can be used, a braid sleeve of known construction has more resiliency than a mesh construction and provides more bias of a damper cushion 103 into the bellows convolution than a mesh sleeve.

Sleeve 101 can extend along the conduit or may be shorter than the conduit 100.

While prior conduits having sleeves wrapped around liners are known, such as in U.S. Pat. No. 9,970,578, that patent does not disclose or suggest dampers, or damper and elastic damper support function as described herein.

It will be appreciated that these alterations and modifications and others of the invention will be readily apparent to those of skill in the art to which this invention pertains without departing from the scope of the invention, and applicant intends to be bound only by claims appended hereto.

What is claimed is:

1. A conduit for flowing hot gas and including:
    an elongated bellows having at least one convoluted portion comprising at least one convolution;
    a liner disposed within said bellows;
    a frequency damper oriented interiorly of said bellows and having a radially outwardly extended projection oriented within a convolution of said bellows; and
    an elastic member disposed between and engaging both said frequency damper and said liner, said elastic member biasing said damper into said bellows and spacing said liner from said bellows; and
    wherein said liner is extensible and wherein said elastic member has a radially extending configuration which is reduced in radial extension upon extension of said liner.

2. A conduit as in claim 1 wherein said elastic member is an elongated strip having at least one end attached to said liner.

3. A conduit as in claim 2 wherein said strip has two ends, each attached to said liner.

4. A conduit as in claim 2 including a plurality of said elastic members.

5. A conduit as in claim 1 wherein said frequency damper is an elongated strip having ends disposed proximate one another.

6. A conduit as in claim 1 including a plurality of frequency dampers spaced along said bellows.

7. A conduit as in claim 1 wherein said elastic member is a circumferential member in a wave-form having at least one crest engaging and biasing said damper into said bellows.

8. A conduit as in claim 1 wherein the elongated bellows comprises a circumferential tube having convolutions proximate both tube ends, and an integral smooth wall portion therebetween.

9. A conduit as in claim 1 wherein said elastic member comprises a sleeve wrapped around said liner.

10. A conduit as in claim 1 wherein said frequency damper includes two radially outwardly extended projections oriented in adjacent convolutions of said bellows.

11. A conduit as claim 1 wherein said liner comprises a tube having a tube wall, and a portion of said tube wall extending radially outwardly of other portions of said tube wall.

12. A conduit as in claim 1 wherein said bellows convolutions comprise an outwardly extending portion and an inwardly extending portion, said frequency damper projecting within said convolution outwardly extending portion and having an inner edge projecting radially inwardly beyond said inwardly extending portion of a convolution toward said liner.

13. A gas flow conduit comprising:
    an elongated, bellows having a convolution therein;
    a liner disposed within said bellows;
    a frequency damper having a portion within said convolution of said bellows;
    a spacer disposed between and engaging both said liner and said damper, spacing said frequency damper from said liner and holding said frequency damper within said bellows convolution; and
    said frequency damper and spacer comprising a two-part subassembly in said conduit spacing said damper away from said liner and said liner away from said bellows.

14. A conduit as in claim 13 wherein said elongated bellows has two convoluted portions, one proximate each end of said bellows, and an integral smooth wall tube therebetween.

15. A gas flow conduit comprising
    an elongated bellows having a series of convolutions;
    a gas liner disposed interiorly of said bellows convolutions;
    a frequency damper extending into at least one bellows convolution;
    said frequency damper having an end portion extending from within said one bellows convolution in an interiorly projecting direction beyond said bellows convolution;
    a spacer disposed between and engaging the extending end portion of said frequency damper and said liner and spacing said frequency damper and said bellows from said liner.

16. A gas flow conduit as in claim 15 wherein said spacer is in the form of a sleeve disposed around said liner.

17. A gas flow conduit as in claim 15 wherein said frequency damper comprises an annulus having an outer circumferential portion and said end portion comprising an inner circumferential portion.

\* \* \* \* \*